(12) United States Patent
Krajec et al.

(10) Patent No.: US 9,021,447 B2
(45) Date of Patent: *Apr. 28, 2015

(54) APPLICATION TRACING BY DISTRIBUTED OBJECTIVES

(71) Applicant: Concurix Corporation, Kirkland, WA (US)

(72) Inventors: Russell S. Krajec, Loveland, CO (US); Ying Li, Bellevue, WA (US)

(73) Assignee: Concurix Corporation, Kirkland, WA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/765,642

(22) Filed: Feb. 12, 2013

(65) Prior Publication Data

US 2013/0283240 A1    Oct. 24, 2013

(51) Int. Cl.
G06F 9/45       (2006.01)
G06F 11/36      (2006.01)
G06F 11/34      (2006.01)

(52) U.S. Cl.
CPC ........ *G06F 11/3636* (2013.01); *G06F 11/3466* (2013.01); *G06F 11/3604* (2013.01); *G06F 11/3644* (2013.01); *G06F 11/3495* (2013.01); *G06F 11/3433* (2013.01); *G06F 11/3447* (2013.01); *G06F 11/3452* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,870,606 | A  * | 2/1999  | Lindsey       | 717/128 |
| 6,032,201 | A  * | 2/2000  | Tillery et al. | 710/8   |
| 6,629,128 | B1 * | 9/2003  | Glass         | 709/203 |
| 6,748,420 | B1 * | 6/2004  | Quatrano et al. | 709/205 |
| 6,892,226 | B1 * | 5/2005  | Tso et al.    | 709/218 |
| 6,928,488 | B1 * | 8/2005  | de Jong et al. | 709/246 |
| 6,981,265 | B1 * | 12/2005 | Rees et al.   | 719/313 |

(Continued)

FOREIGN PATENT DOCUMENTS

| | | |
|---|---|---|
| EP | 2390790 A1 | 11/2011 |
| WO | 0007100 A1 | 2/2000 |

(Continued)

OTHER PUBLICATIONS

International Search Authority, International Search Report and Written Opinion, Korean Intellectual Property Office, PCT/US2013/046664, Nov. 20, 2013.

(Continued)

*Primary Examiner* — Isaac T Tecklu
(74) *Attorney, Agent, or Firm* — Æon Law; Adam L. K. Philipp

(57) ABSTRACT

A tracing system may divide trace objectives across multiple instances of an application, then deploy the objectives to be traced. The results of the various objectives may be aggregated into a detailed tracing representation of the application. The trace objectives may define specific functions, processes, memory objects, events, input parameters, or other subsets of tracing data that may be collected. The objectives may be deployed on separate instances of an application that may be running on different devices. In some cases, the objectives may be deployed at different time intervals. The trace objectives may be lightweight, relatively non-intrusive tracing workloads that, when results are aggregated, may provide a holistic view of an application's performance.

19 Claims, 16 Drawing Sheets

(56) References Cited

U.S. PATENT DOCUMENTS

| | | | |
|---|---|---|---|
| 7,117,504 B2* | 10/2006 | Smith et al. | 719/328 |
| 7,194,664 B1 | 3/2007 | Fung et al. | |
| 7,386,839 B1 | 6/2008 | Golender et al. | |
| 8,032,866 B1 | 10/2011 | Golender et al. | |
| 8,312,056 B1 | 11/2012 | Peng et al. | |
| 8,495,598 B2 | 7/2013 | Gounares et al. | |
| 8,595,743 B2 | 11/2013 | Gounares et al. | |
| 8,607,018 B2 | 12/2013 | Gounares et al. | |
| 8,615,766 B2 | 12/2013 | Gounares | |
| 8,650,538 B2 | 2/2014 | Gounares | |
| 8,656,134 B2 | 2/2014 | Gounares et al. | |
| 8,656,135 B2 | 2/2014 | Gounares et al. | |
| 8,656,378 B2 | 2/2014 | Gounares et al. | |
| 8,694,574 B2 | 4/2014 | Gounares et al. | |
| 8,700,838 B2 | 4/2014 | Gounares | |
| 8,707,326 B2 | 4/2014 | Garrett | |
| 8,726,255 B2 | 5/2014 | Gounares et al. | |
| 8,752,021 B2 | 6/2014 | Li et al. | |
| 8,752,034 B2 | 6/2014 | Gounares et al. | |
| 2002/0073063 A1 | 6/2002 | Faraj | |
| 2002/0112033 A1* | 8/2002 | Doemling et al. | 709/219 |
| 2002/0199172 A1* | 12/2002 | Bunnell | 717/128 |
| 2003/0041069 A1* | 2/2003 | Yorke | 707/103 R |
| 2003/0058277 A1* | 3/2003 | Bowman-Amuah | 345/765 |
| 2003/0061574 A1 | 3/2003 | Saluja et al. | |
| 2003/0231207 A1* | 12/2003 | Huang | 345/752 |
| 2004/0015929 A1 | 1/2004 | Lewis et al. | |
| 2004/0034853 A1* | 2/2004 | Gibbons et al. | 717/174 |
| 2004/0139480 A1* | 7/2004 | Delpuch et al. | 725/135 |
| 2004/0239681 A1* | 12/2004 | Robotham et al. | 345/581 |
| 2005/0015368 A1* | 1/2005 | Payton et al. | 707/4 |
| 2005/0108259 A1* | 5/2005 | Watanabe et al. | 707/100 |
| 2005/0108517 A1* | 5/2005 | Dillon et al. | 713/150 |
| 2005/0188272 A1 | 8/2005 | Bodorin et al. | |
| 2005/0198332 A1* | 9/2005 | Laertz et al. | 709/229 |
| 2005/0262181 A1* | 11/2005 | Schmidt et al. | 709/200 |
| 2005/0262493 A1* | 11/2005 | Schmidt et al. | 717/164 |
| 2005/0262512 A1* | 11/2005 | Schmidt et al. | 719/310 |
| 2006/0015612 A1 | 1/2006 | Shimazaki et al. | |
| 2006/0106843 A1 | 5/2006 | Middelfart et al. | |
| 2006/0156017 A1* | 7/2006 | McIsaac et al. | 713/182 |
| 2006/0200738 A1* | 9/2006 | Tarle et al. | 715/500 |
| 2006/0248177 A1 | 11/2006 | Dostert et al. | |
| 2006/0277477 A1* | 12/2006 | Christenson | 715/760 |
| 2007/0016949 A1* | 1/2007 | Dunagan et al. | 726/22 |
| 2007/0050174 A1 | 3/2007 | Dewitt et al. | |
| 2007/0100967 A1* | 5/2007 | Smith et al. | 709/219 |
| 2007/0118538 A1 | 5/2007 | Ahern et al. | |
| 2007/0136201 A1* | 6/2007 | Sah et al. | 705/51 |
| 2007/0136320 A1* | 6/2007 | Sah et al. | 707/100 |
| 2007/0136337 A1* | 6/2007 | Sah et al. | 707/101 |
| 2007/0136443 A1* | 6/2007 | Sah et al. | 709/219 |
| 2007/0140131 A1 | 6/2007 | Malloy et al. | |
| 2007/0143795 A1 | 6/2007 | Tran | |
| 2007/0180147 A1* | 8/2007 | Leigh | 709/246 |
| 2007/0192468 A1* | 8/2007 | Keeler | 709/223 |
| 2007/0198524 A1* | 8/2007 | Branda et al. | 707/10 |
| 2007/0204010 A1* | 8/2007 | Sah et al. | 709/219 |
| 2007/0204223 A1* | 8/2007 | Bartels et al. | 715/540 |
| 2007/0226758 A1* | 9/2007 | Waldo et al. | 719/330 |
| 2007/0239528 A1* | 10/2007 | Xie et al. | 705/14 |
| 2007/0245310 A1* | 10/2007 | Rosenstein et al. | 717/116 |
| 2008/0104451 A1 | 5/2008 | Blanchard et al. | |
| 2008/0127109 A1 | 5/2008 | Simeon | |
| 2008/0140985 A1 | 6/2008 | Kitamorn et al. | |
| 2008/0155348 A1 | 6/2008 | Ivanov et al. | |
| 2008/0168472 A1 | 7/2008 | Wilson | |
| 2008/0271038 A1 | 10/2008 | Rolia et al. | |
| 2008/0282232 A1 | 11/2008 | Cong et al. | |
| 2008/0313502 A1 | 12/2008 | Mcfadden et al. | |
| 2009/0037873 A1 | 2/2009 | Ahadian et al. | |
| 2009/0157723 A1 | 6/2009 | De et al. | |
| 2009/0313525 A1 | 12/2009 | Savin et al. | |
| 2010/0077388 A1 | 3/2010 | Kimura | |
| 2010/0138431 A1 | 6/2010 | Bator et al. | |
| 2010/0223581 A1 | 9/2010 | Manolescu et al. | |
| 2010/0281488 A1 | 11/2010 | Krishnamurthy et al. | |
| 2011/0004598 A1 | 1/2011 | Kikuchi | |
| 2011/0153817 A1 | 6/2011 | Wright et al. | |
| 2011/0314343 A1 | 12/2011 | Hoke et al. | |
| 2012/0042212 A1 | 2/2012 | Laurenti | |
| 2012/0079108 A1 | 3/2012 | Findeisen | |
| 2012/0102029 A1 | 4/2012 | Larson et al. | |
| 2012/0117438 A1 | 5/2012 | Shaffer et al. | |
| 2012/0137273 A1 | 5/2012 | Meijler et al. | |
| 2012/0204156 A1 | 8/2012 | Kettley et al. | |
| 2012/0221314 A1 | 8/2012 | Bourlatchkov et al. | |
| 2012/0222019 A1 | 8/2012 | Gounares et al. | |
| 2012/0222043 A1 | 8/2012 | Gounares et al. | |
| 2012/0227040 A1 | 9/2012 | Gounares | |
| 2012/0233592 A1 | 9/2012 | Gounares | |
| 2012/0233601 A1 | 9/2012 | Gounares et al. | |
| 2012/0290672 A1 | 11/2012 | Robinson et al. | |
| 2012/0296991 A1 | 11/2012 | Spivack et al. | |
| 2012/0317371 A1 | 12/2012 | Gounares et al. | |
| 2012/0317389 A1 | 12/2012 | Gounares et al. | |
| 2012/0317421 A1 | 12/2012 | Gounares et al. | |
| 2012/0317557 A1 | 12/2012 | Garrett et al. | |
| 2012/0317577 A1 | 12/2012 | Garrett et al. | |
| 2012/0317587 A1 | 12/2012 | Garrett et al. | |
| 2012/0323827 A1 | 12/2012 | Lakshmanan et al. | |
| 2012/0324454 A1 | 12/2012 | Gounares et al. | |
| 2012/0330700 A1 | 12/2012 | Garg et al. | |
| 2013/0018925 A1 | 1/2013 | Pegg | |
| 2013/0067445 A1 | 3/2013 | Gounares et al. | |
| 2013/0073523 A1 | 3/2013 | Gounares et al. | |
| 2013/0073604 A1 | 3/2013 | Gounares et al. | |
| 2013/0073829 A1 | 3/2013 | Gounares et al. | |
| 2013/0073837 A1 | 3/2013 | Li et al. | |
| 2013/0074049 A1 | 3/2013 | Gounares et al. | |
| 2013/0074055 A1 | 3/2013 | Gounares et al. | |
| 2013/0074056 A1 | 3/2013 | Gounares et al. | |
| 2013/0074057 A1 | 3/2013 | Gounares et al. | |
| 2013/0074058 A1 | 3/2013 | Gounares et al. | |
| 2013/0074092 A1 | 3/2013 | Gounares et al. | |
| 2013/0074093 A1 | 3/2013 | Gounares et al. | |
| 2013/0080760 A1 | 3/2013 | Li et al. | |
| 2013/0080761 A1 | 3/2013 | Garrett et al. | |
| 2013/0081005 A1 | 3/2013 | Gounares et al. | |
| 2013/0085882 A1 | 4/2013 | Gounares et al. | |
| 2013/0117753 A1 | 5/2013 | Gounares et al. | |
| 2013/0117759 A1 | 5/2013 | Gounares et al. | |
| 2013/0219057 A1 | 8/2013 | Li et al. | |
| 2013/0219372 A1 | 8/2013 | Li et al. | |
| 2013/0227529 A1 | 8/2013 | Li et al. | |
| 2013/0227536 A1 | 8/2013 | Li et al. | |
| 2013/0229416 A1 | 9/2013 | Krajec et al. | |
| 2013/0232174 A1 | 9/2013 | Krajec et al. | |
| 2013/0232433 A1 | 9/2013 | Krajec et al. | |
| 2013/0232452 A1 | 9/2013 | Krajec et al. | |
| 2013/0282545 A1 | 10/2013 | Gounares et al. | |
| 2013/0283102 A1 | 10/2013 | Krajec et al. | |
| 2013/0283240 A1 | 10/2013 | Krajec et al. | |
| 2013/0283241 A1 | 10/2013 | Krajec et al. | |
| 2013/0283242 A1 | 10/2013 | Gounares | |
| 2013/0283246 A1 | 10/2013 | Krajec et al. | |
| 2013/0283247 A1 | 10/2013 | Krajec et al. | |
| 2013/0283281 A1 | 10/2013 | Krajec et al. | |
| 2013/0298112 A1 | 11/2013 | Gounares et al. | |
| 2014/0013306 A1 | 1/2014 | Gounares et al. | |
| 2014/0013308 A1 | 1/2014 | Gounares et al. | |
| 2014/0013309 A1 | 1/2014 | Gounares | |
| 2014/0013311 A1 | 1/2014 | Garrett et al. | |
| 2014/0019598 A1 | 1/2014 | Krajec | |
| 2014/0019756 A1 | 1/2014 | Krajec | |
| 2014/0019879 A1 | 1/2014 | Krajec et al. | |
| 2014/0019985 A1 | 1/2014 | Krajec | |
| 2014/0025572 A1 | 1/2014 | Krajec | |
| 2014/0026142 A1 | 1/2014 | Gounares et al. | |
| 2014/0040591 A1 | 2/2014 | Gounares | |

(56) References Cited

U.S. PATENT DOCUMENTS

FOREIGN PATENT DOCUMENTS

| WO | 2011116988 A1 | 9/2011 |
| WO | 2011142720 A1 | 11/2011 |
| WO | 2012106571 A2 | 8/2012 |

OTHER PUBLICATIONS

International Search Authority, International Search Report and Written Opinion, Korea Intellectual Property Office, PCT/US2013/073894, Apr. 1, 2014.

International Search Authority, International Search Report and Written Opinion, Korean Intellectual Property Office, PCT/US2013/047211, Nov. 27, 2013.

International Search Authority, International Search Report and Written Opinion, Korean Intellectual Property Office, PCT/US2013/043811, Nov. 28, 2013.

International Search Authority, International Search Report and Written Opinion, Korean Intellectual Property Office, PCT/US2013/046925, Nov. 25, 2013.

International Search Authority, International Search Report and Written Opinion, Korean Intellectual Property Office, PCT/US2013/046918, Nov. 25, 2013.

International Search Authority, International Search Report and Written Opinion, Korean Intellectual Property Office, PCT/US2013/043492, Nov. 6, 2013.

International Search Authority, International Search Report and Written Opinion, Korean Intellectual Property Office, PCT/US2013/044193, Oct. 29, 2013.

International Search Authority, International Search Report and Written Opinion, Korean Intellectual Property Office, PCT/US2013/046050, Nov. 8, 2013.

International Search Authority, International Search Report and Written Opinion, Korean Intellectual Property Office, PCT/US2013/046922, Dec. 17, 2013.

International Search Authority, International Search Report and Written Opinion, Korean Intellectual Property Office, PCT/US2013/043522, Nov. 12, 2013.

* cited by examiner

APPLICATION TRACING BY DISTRIBUTED OBJECTIVES

BACKGROUND

Tracing gathers information about how an application executes within a computer system. Tracing data may include any type of data that may explain how the application operates, and such data may be analyzed by a developer during debugging or optimization of the application. Tracing data may also be used by an administrator during production operation of the application to identify various problems.

Tracing that occurs during development and debugging can be very detailed. In some cases, the tracing operations may adversely affect system performance, as the tracing operations may consume large amounts of processing, storage, or network bandwidth.

SUMMARY

A tracing system may divide trace objectives across multiple instances of an application, then deploy the objectives to be traced. The results of the various objectives may be aggregated into a detailed tracing representation of the application. The trace objectives may define specific functions, processes, memory objects, events, input parameters, or other subsets of tracing data that may be collected. The objectives may be deployed on separate instances of an application that may be running on different devices. In some cases, the objectives may be deployed at different time intervals. The trace objectives may be lightweight, relatively non-intrusive tracing workloads that, when results are aggregated, may provide a holistic view of an application's performance.

A tracing system may perform cost analysis to identify burdensome or costly trace objectives. For a burdensome objective, two or more objectives may be created that can be executed independently. The cost analysis may include processing, storage, and network performance factors, which may be budgeted to collect data without undue performance or financial drains on the application under test. A larger objective may be recursively analyzed to break the larger objective into smaller objectives which may be independently deployed.

A tracing management system may use cost analyses and performance budgets to dispatch tracing objectives to instrumented systems that may collect trace data while running an application. The tracing management system may analyze individual tracing workloads for processing, storage, and network performance costs, and select workloads to deploy based on a resource budget that may be set for a particular device. In some cases, complementary tracing objectives may be selected that maximize consumption of resources within an allocated budget. The budgets may allocate certain resources for tracing, which may be a mechanism to limit any adverse effects from tracing when running an application.

A tracing system may optimize collected data by identifying periodicities within the collected data, then updating sampling rates and data collection windows. The updated parameters may be used to re-sample the data and perform more detailed analysis. The optimization may be based on a preliminary trace analysis from which a set of frequencies may be extracted as used for a default set of parameters. The tracing system may use multiple independent trace objectives that may be deployed to gather data, and each trace objective may be optimized using periodicity analysis to collect statistically significant data.

Periodicity similarity between two different tracer objectives may be used to identify additional input parameters to sample. The tracer objectives may be individual portions of a large tracer operation, and each of the tracer objectives may have separate set of input objects for which data may be collected. After collecting data for a tracer objective, other tracer objectives with similar periodicities may be identified. The input objects from the other tracer objectives may be added to a tracer objective and the tracer objective may be executed to determine a statistical significance of the newly added objective. An iterative process may traverse multiple input objects until exhausting possible input objects and a statistically significant set of input objects are identified.

Tracer objectives in a distributed tracing system may be compared to identify input parameters that may have a high statistical relevancy. An iterative process may traverse multiple input objects by comparing results of multiple tracer objectives and scoring possible input objects as being possibly statistically relevant. With each iteration, statistically irrelevant input objects may be discarded from a tracer objective and other potentially relevant objects may be added. The iterative process may converge on a set of statistically relevant input objects for a given measured value without a priori knowledge of an application being traced.

A distributed tracing system may use independent tracer objectives for which a profile model may be created. The profile model may be deployed as a monitoring agent on non-instrumented devices to evaluate the profile models. As the profile models operate with statistically significant results, the sampling frequencies may be adjusted. The profile models may be deployed as a verification mechanism for testing models created in a more highly instrumented environment, and may gather performance related results that may not have been as accurate using the instrumented environment. In some cases, the profile models may be distributed over large numbers of devices to verify models based on data collected from a single or small number of instrumented devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Application Tracing with Distributed Objectives

Figure 1:
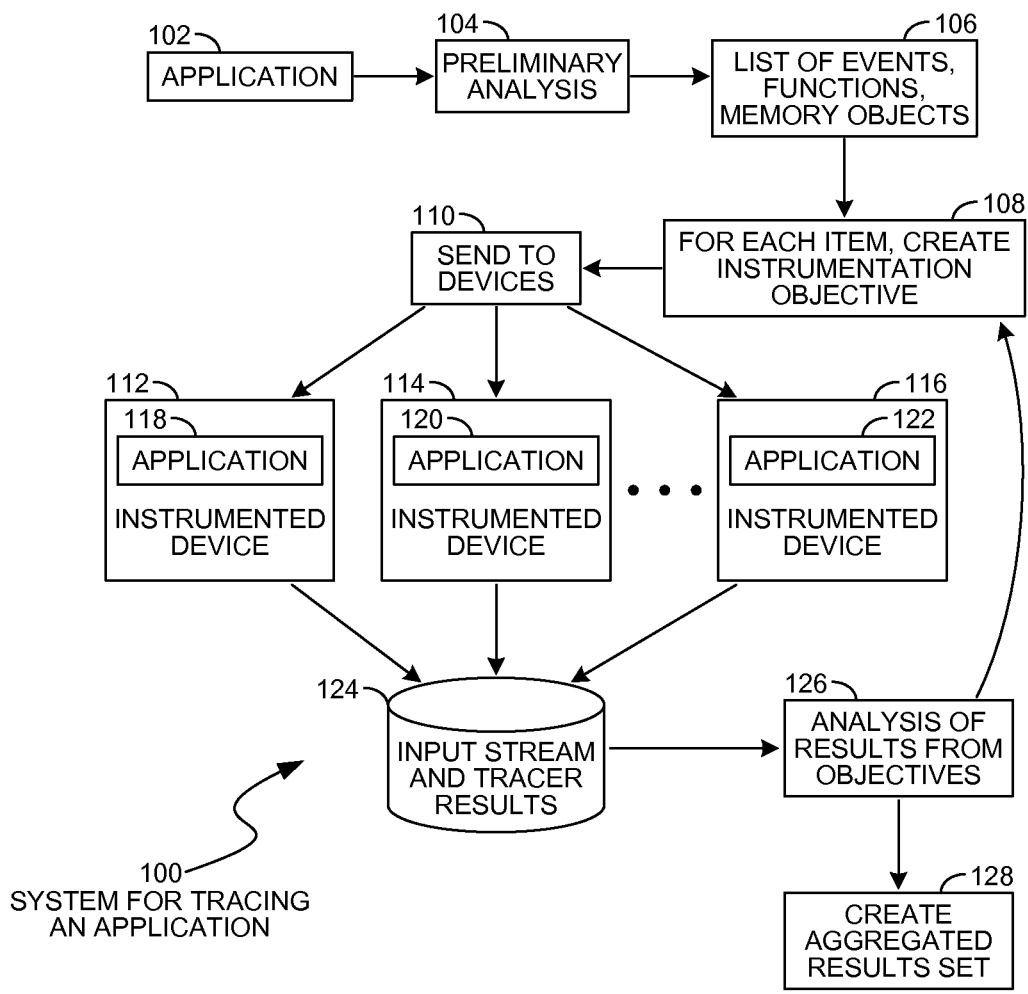
FIG. 1 is a diagram illustration of an embodiment showing a system for tracing an application.

A system for tracing an application may gather trace data from discrete, independent objectives that may be executed against multiple instances of the application. The system may divide the tracing workload into individual objectives, then dispatch those objectives to collect subsets of data. The trace data may be aggregated into a complete dataset.

In tracing a large application, the application may be considered to be a large system that responds to stimuli, which are the input events, data, or other stimuli. When a theoretical assumption may be made that the application behaves in a relatively consistent manner, the tracing may be broken into many smaller units and the results aggregated together to give a detailed picture of the entire application. The smaller units may be known as 'trace objectives' that may be dispatched to gather some portion of the larger set of trace data.

The trace objectives may be a set of definitions for how to collect trace data and conditions for collecting trace data. The trace objectives may be consumed by a tracer operating within an instrumented environment, which may be configured to collect many different types of trace data and many different data objects. The objectives may also include connection definitions that establish a network connection to a data gathering and storage system. In many cases, the trace objectives may be described in a configuration file that may be transmitted to a tracer.

In many cases, detailed tracing may consume a large amount of computing, storage, and network bandwidth resources. For example, many tracing algorithms may increase the computation workload of a device by a factor of three or more. When such a load may be placed on a system, the performance of the application may be extremely degraded. By creating many smaller objectives that each cause a small amount of tracing to be performed, the detailed tracing results may still be achievable, but with a lower impact to the running application.

A distributed tracing system may have a smaller footprint than a more detailed tracing system, as the tracing workload may be distributed to multiple instances of the application or as individual workloads that may be executed sequentially on one device. In many cases, the tracing may be performed using a very large number of devices, where each device performs a relatively small subset of the larger tracing task. In such cases, a full view of the application functions may be obtained with minimal impact on each of the many devices.

The tracing system may automatically determine how to perform tracing in an optimized manner. An initial analysis of an application may uncover various functions, memory objects, events, or other objects that may serve as the foundation for a trace objective. The automated analysis may identify related memory objects, functions, and various items for which data may be collected, all of which may be added to a trace objective.

Once the trace objectives have been prepared, the trace objectives may be dispatched to be fulfilled by various instrumented execution environments. The trace results may be transmitted to a centralized collector, which may store the raw data. For each objective, a post collection analysis may evaluate the results to determine if the data are sufficient to generate a meaningful summary statistic, which may be a profile model for how an application's various components respond to input.

When the results of an objective cannot be verified with statistical certainty, the objective may be refactored and re-executed against the application. In some cases, the objective may be run for a longer time window to collect more data, while in other cases the objective may have items added or removed prior to re-execution.

Cost Analysis for Selecting Trace Objectives

A trace objective may be automatically evaluated using a cost analysis to determine if the objective may be too large or too burdensome to execute. When the objective becomes too burdensome, the objective may be split into two or more smaller objectives, where the results may be combined.

The cost analysis may evaluate execution costs, such as processor consumption, network bandwidth consumption, storage consumption, power consumption, or other resource consumption. In many such cases, a cost limit may be placed on a trace objective to limit the amount of resources that may be allocated for tracing. In some embodiments, the cost may be quantifiable financial costs that may be attributed to consuming various resources.

Dividing a larger objective into multiple smaller objectives may use relationships within the various data objects to place related objects in the same smaller objective. For example, a larger objective may involve tracing multiple data items for an executable function. Some of the outputs of the function may be consumed by one downstream function while other outputs of the function may be consumed by a different downstream function. When such relationships are available and known, the system may place the outputs for the first function in one trace objective and the outputs for the second function in a second trace objective.

The costs for analyzing an objective's impact may be estimated or measured. In some cases, an objective may be selected from a library of data collection templates. Each template may have estimated costs for performing different aspects of the template, and the estimated costs may be used for evaluating a trace objective.

In some cases, the costs for an objective may be measured. In such cases, the objective may be executed for a short period of time while collecting cost data, such as impact on processors, storage, or network bandwidth. Once such costs are known, an analysis may be performed to determine whether or not to split the objective into multiple smaller objectives.

Throughout this specification and claims, the term "costs" in the context of evaluating trace objectives may be a general term that reflects any cost, expense, resource, tax, or other impediment created by a trace objective. In general, costs refer to anything that has an effect that may be minimized.

Deploying Trace Objectives Using Cost Analyses

Trace objectives may be deployed using cost estimate for the trace objectives and resource budgets on tracing devices. The budgets may define a resource allocation for trace objectives, and a dispatcher may select trace objectives that may utilize the allocated resources.

Multiple trace objectives may be dispatched to a device when the sum of the resources consumed by all of the trace objectives are less than the budgeted amount. The trace objectives may be dispatched using a manifest that may include all of the assigned trace objectives.

A trace resource budget may define a maximum amount of resources that may be allocated to tracing workloads on a particular device. The budget may vary between devices, based on the hardware and software configuration, as well as any predefined resource or performance allocations. In some cases, a particular device or instance of an application may be allocated to meet minimum performance standards, leaving remaining resources to be allocated to tracing operations.

The assignment of trace objectives by cost may allow a minimum application performance to be maintained even while tracing is being performed. The minimum application performance may ensure that application throughput may be maintained when tracing is deployed in a production environment, as well as ensure that tracing does not adversely affect any data collected during tracing.

Periodicity Optimization in an Automated Tracing System

An automated tracing system may analyze periodicities in collected data, then adjust sampling rates and data collection windows to collect data that effectively captures the observed periodicities. An initial, high level trace may gather general performance parameters for an arbitrary application under test.

From the initial tracing, periodicity analysis may be performed to identify characteristic frequencies of the data. The characteristic frequencies of the initial data may be used to set a default sampling rate and data collection window for detailed tracer objectives that may be deployed.

As results may be captured from the tracer objectives, a second periodicity analysis may identify additional repeating patterns in the data. From the second periodicity analysis, the sampling rate and data collection window may be updated or optimized to collect statistically meaningful data.

In some embodiments, a tracer objective may be deployed with different parameters to explore repeating patterns at higher or lower frequencies than the default settings. Such an embodiment may test for statistically relevant frequencies, then collect additional data when statistically relevant frequencies are found. As an arbitrary application is traced, the list of dominant frequencies within the application may be applied to other tracer objectives.

The sampling rate of a tracer objective may define the smallest period or highest frequency that may be observed in a time series of data. Similarly, the data collection window may define the largest period or lowest frequency that may be observed. By ensuring that known frequencies are covered in a results set, a statistically meaningful determination may be made whether or not such frequencies appear in a set of observed data.

Optimization Analysis Using Similar Frequencies

An automatic optimization system may create statistically meaningful representations of an application performance by iterating on the input parameters that may affect a traced performance metric. After selecting a starting set of potential input parameters that may affect a measured or traced metric, statistically insignificant input parameters may be removed and potentially relevant parameters may be added to a tracer objective.

The observed metric may be analyzed for periodicity, the result of which may be a set of frequencies found in the data. The set of frequencies may be used as a signature, which may be matched with frequency signatures of other tracer objectives. The matching tracer objectives may be analyzed to identify statistically significant input parameters in the other tracer objectives, and those input parameters may be considered as potential input parameters.

The frequency analysis may attempt to match tracer objectives that have similar observed characteristics in the time domain by matching similar frequency signatures. Two tracer objectives that may have similar frequency signatures may react similarly to stimuli or have other behavioral similarities. In many cases, the input parameters that may affect the behavior observed with one tracer objective may be somehow related to input parameters that may affect the behavior observed with another tracer objective.

In some cases, the frequency comparisons may examine a dominant frequency found within the data. Such cases may be occur when analysis of the various tracer objective results yields several different dominant frequencies. In other cases, a single dominant frequency may be observed in a large number of results sets. In such cases, the comparisons may be made using a secondary frequency which may be a characteristic frequency after the dominant frequency may be removed.

In embodiments where multiple frequencies may be observed from the data, a frequency signature may be created that reflects the frequencies and the strength or importance of each frequency. The signatures may be compared using a similarity comparison to identify matches. In some embodiments, the comparisons may be performed using a score that may indicate a degree of similarity.

Deployment of Profile Models with a Monitoring Agent

Some tracing systems may create profile models that may represent tracing data. The models may then be deployed to monitors that may test the profile models against additional data. When the profile models successfully track additional data, the monitoring may be halted or reduced to a lower frequency. When the profile models may not successfully track additional data, the trace objectives used to create the original data may be refactored and redeployed so that new or updated models may be generated.

The monitoring system may operate with less cost than with a tracer. In many cases, a tracer may consume overhead processes, storage, and network traffic that may adversely affect application performance and may adversely affect financial costs of executing an application. A monitoring system may have much less overhead than a tracer and may be configurable to gather just specific data items and test the data items using a profile model.

In some systems, an instrumented execution environment with a tracer system may be deployed on a subset of devices, while a monitoring system may be deployed on all or a larger subset of devices. By using the monitoring system for testing or verification of the profile models, the complex and costly data collection operations may be performed on a subset of devices while the less costly monitoring operations may be performed on a different subset of devices.

Throughout this specification and claims, the term "trace objective" or "tracer objective" is used to refer to a set of configuration settings, parameters, or other information that may be consumed by a tracer to collect data while an application executes. The trace objective may be embodied in any manner, such as a configuration file or other definition that may be transmitted to and consumed by a tracer. In some cases, the trace objective may include executable code that may be executed by the tracer in order to collect data. The tracer object may often contain a connection definition that may enable a network connection to a remote device that may collect data for storage and analysis.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for tracing an application. Embodiment 100 is a simplified example of a sequence for creating trace objectives, deploying the objectives, and analyzing the results.

Embodiment 100 illustrates an example of a tracing system that may be fully automated or at least largely automated to collect data about an application. The resulting data may be a characterization of the application, including profile models of the application as a whole or at least for some subsets of the application. The results may be used to analyze and debug the application, design monitoring metrics, or other uses.

Embodiment 100 illustrates a generalized operation that takes an application 102 and does some preliminary analysis 104 to create lists 106 of events, functions, memory objects, and other potentially interesting objects for tracing. From the lists 106, instrumentation or trace objectives 108 may be created and deployed 110 to various instrumented devices 112, 114, and 116.

Each of the instrumented devices 112, 114, and 116 may execute an instance of the application 118, 120, and 122, respectively, and the instrumentation may generate results in the form of input streams and tracer results 124. The results 124 may be analyzed 126, which may cause the instrumentation objectives 108 to be updated and redeployed, or an aggregated results set 128 may be generated.

The various instrumented devices may be any device capable of collecting data according to a trace objective. In some cases, the instrumented devices may have specialized or dedicated hardware or software components that may collect data. In other cases, an instrumented system may be a generic system that may be configured to collect data as defined in a tracer objective.

Embodiment 100 illustrates a system that may be automated to generate tracing data for an application by splitting the tracing workload into many small trace objectives. The smaller trace objectives may be deployed such that the trace objectives may not adversely interfere with the execution of the application.

Smaller trace objectives may allow much more detailed and fine grained data collection than may be possible with a complete tracer that may capture all data at once. In many cases, capturing a very detailed set of data may consume large amounts of processor, storage, network bandwidth, or other resources.

When smaller trace objectives are used, the data collected from different trace objectives may not be from precisely the same set of input parameters to the application. As such, the results from the smaller trace objectives may undergo various analyses to determine whether or not the results may be repeatable. When the results are shown to be repeatable, the results may be aggregated from multiple trace objectives to create a superset of data.

Embodiment 100 illustrates an example where an application may be performed by several devices. In some cases, each device may execute an identical instance of the application. An example may be a website application that may be load balanced such that each device executes an identical copy. In other cases, each device may execute a subset of a larger application. An example may be a distributed application where each device performs a set of functions or operations that may cause data to pass to another device for further processing.

Figure 2:
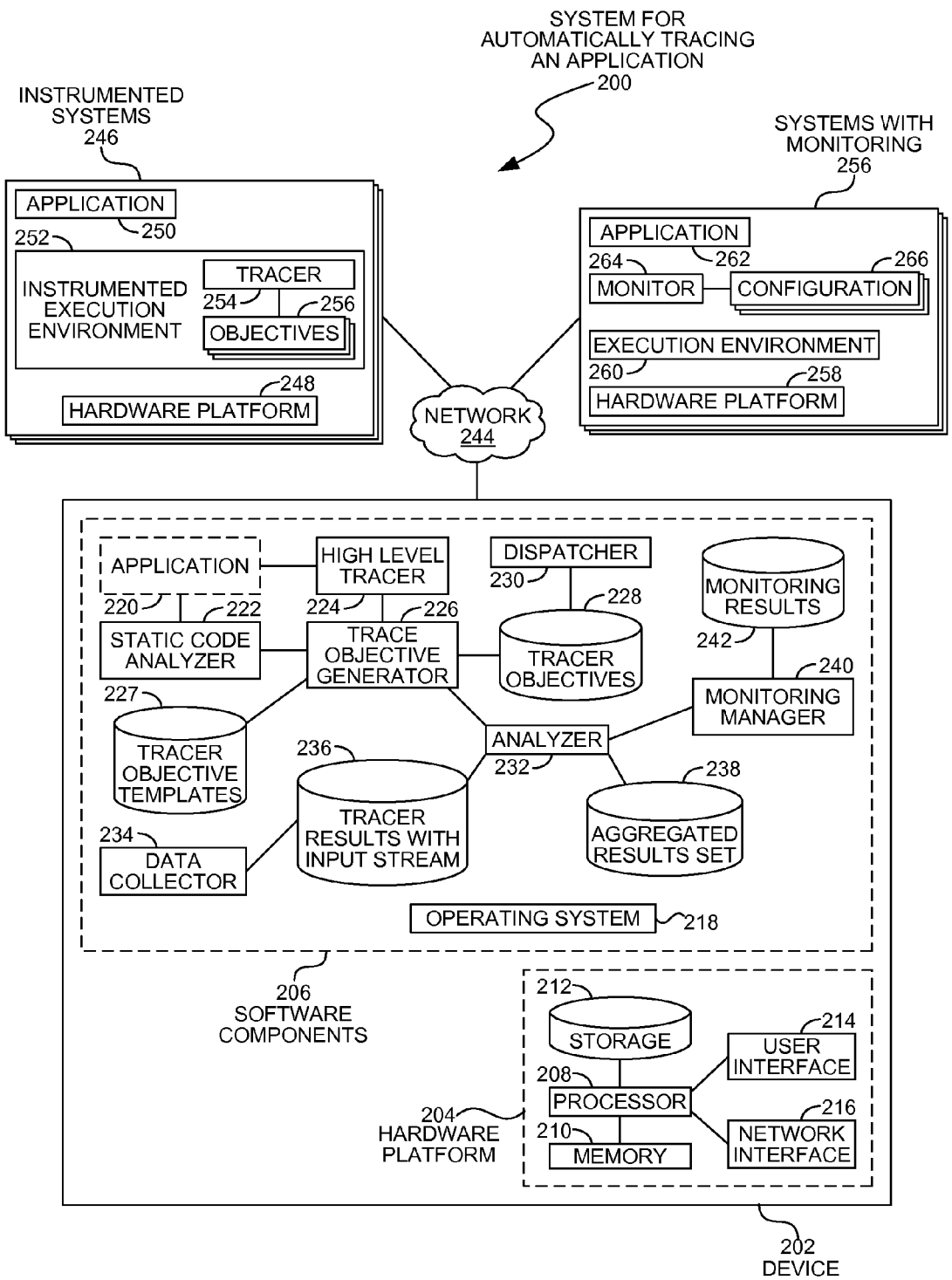
FIG. 2 is a diagram illustration of an embodiment showing a device that may create trace objectives, deploy the objectives, and analyze results.

FIG. 2 is a diagram of an embodiment 200 showing a computer system with a system for automatically tracing an application using independent trace objectives. Embodiment 200 illustrates hardware components that may deliver the operations described in embodiment 100, as well as other embodiments.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the optimization server 202 may be a server computer. In some embodiments, the optimization server 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

Embodiment 200 illustrates many software components 206 as deployed on a single device 202. In other embodiments, some or all of the various software components 206 may be deployed on separate devices or even on clusters of devices.

Device 202 illustrates many of the software components that may manage the tracing of an application 220.

A preliminary analysis of the application 220 may be performed using a static code analyzer 222 or a high level tracer 224. In some embodiments, both a static code analyzer 222 and a high level tracer 224 may be used.

The static code analyzer 222 may examine source code, intermediate code, binary code, or other representation of the application 220 to identify various elements that may be traced or for which data may be collected. For example, a static code analyzer 222 may identify various functions, subroutines, program branches, library routines, or other portions of the executable code of the application 220, each of which may be an element for which data may be gathered. Additionally, a static code analyzer 222 may identify memory objects, parameters, input objects, output objects, or other memory elements or data objects that may be sampled or retrieved.

The high level tracer 224 may be a lightweight tracing system that may monitor an executing application 220 and identify sections of code that are executed, memory objects that are manipulated, interrupts that may be triggered, errors, inputs, outputs, or other elements, each of which may or may not have data elements that may be gathered during tracing.

The static code analyzer 222 or the high level tracer 224 may create a flow control graph or other representation of relationships between elements. The relationships may be traversed to identify related objects that may be useful when generating trace objectives 228.

The various elements may be analyzed by the trace objective generator 226 to create a trace objective 228. Once created, a dispatcher 230 may cause the trace objectives 228 to be executed by a tracer.

The trace objective generator 226 may generate independently executable trace objectives that generate data regarding the application 220 when the application 220 is executed. The independent trace objectives 228 may be constructed by identifying an element to be traced, which may be a function, memory object, interrupt, input object, output object, or other element.

Once a starting element may be identified, the trace objective generator 226 may attempt to find related items that may also be traced. For example, a function may be identified as a starting element. Related items may include input parameters passed to the function and results transmitted from the function. Further related items may be functions called by the starting function and the various parameters passed to those functions. Regarding each function, related items may include the processing time consumed by the function, heap memory allocated, memory objects created or changed by the function, and other parameters.

In some embodiments, a set of trace objective templates 227 may be available. A trace objective template 227 may be a starting framework for tracing a specific object. For example, a trace objective template 227 may be created for tracing a specific type of function, where the template may include parameters that may typically be measured for a specific type of function. Other examples may include templates for tracing different types of memory objects, interrupts, input objects, output objects, error conditions, and the like.

The various templates may include cost estimating parameters, which may be used to assess or estimate the impact of a particular trace objective. The cost estimating parameters may include financial cost as well as performance costs, resource consumption costs, or other costs. The estimated costs may be a factor used by a trace objective generator 226 to determine whether a given trace objective may be too large, complex, or costly to execute and therefore may be split into multiple smaller trace objectives.

When a high level tracer 224 may be used, periodicity data may be extracted from the data collected. Periodicity data may include any repeating pattern or frequency of data that repeats. Periodicity data may be used by the trace objective generator 226 to select a data collection window that may be sized to capture periodic data. When a data collection window is smaller than a known repeating period, any profile model or other analysis may not fully capture the behavior of the data.

The trace objective generator 226 may create execution parameters for a trace objective. The execution parameters may include a data collection window. In some cases, a data collection window may be defined by a start time and end time. In other cases, a data collection window may be defined by a number of values collected, amount of data collected, or other conditions. In still other cases, starting and stopping conditions may include event monitoring. For example, a starting condition may begin tracing when a specific input event occurs or an ending condition may be defined when a memory object reaches a certain value.

The execution parameters may include data collection parameters, such as sampling frequency. In some cases, data collection parameters may also include definitions of when to collect data, which may be dependent on calculated, measured, or observed data. For example, data may be collected when a parameter X is equal to zero, when the processor load is less than 80%, or some other condition.

The trace objective generator 226 may transmit executable code to a tracer. The executable code may include condition definitions or other code that may be evaluated during execution. The executable code may also include instrumentation or other code that may collect specific types of data.

In some cases, the executable code may be inserted into an application to retrieve values, perform calculations, or other functions that may generate data. In some embodiments, executable code may be included in trace objective templates 227, and the executable code may be customized or modified by the trace objective generator 226 prior to inclusion in a trace objective.

The trace objective generator 226 may define input conditions for a given traced object. The input conditions may be data that are collected in addition to the objects targeted for monitoring. In some embodiments, the input conditions may be analyzed and evaluated to compare different runs of the same or related trace objectives. The input conditions may include any input parameter, object, event, or other condition that may affect the monitored object. In many embodiments, a profile model may be created that may represent the behavior of the monitored object, and the input conditions may be used as part of the profile model.

The trace objective generator 226 may create multiple trace objectives 228 which may be transmitted to various instrumented systems 246 by a dispatcher 230.

The dispatcher 230 may determine a schedule for executing trace objectives and cause the trace objectives to be executed. The schedule may include identifying which device may receive a specific trace objective, as well as when the trace objective may be executed. In some cases, the dispatcher 230 may cause certain trace objectives to be executed multiple times on multiple devices and, in some cases, in multiple conditions.

A data collector 234 may receive output from the trace objectives and store the results and input stream 236 in a database. An analyzer 232 may analyze the data to first determine whether the data may be repeatable, then to aggregate results from multiple trace objectives into an aggregated results set 238. In many embodiments, the analyzer 232 may create profile models that may represent the observed data. Such profile models may be used for various scenarios, such as identifying bottlenecks or mapping process flow in a development or debugging scenario, monitoring costs or performance in a runtime or administrative scenario, as well as other uses.

The instrumented systems 246 may be connected to the device 202 through a network 244. The network 244 may be the Internet, a local area network, or any other type of communications network.

The instrumented systems 246 may operate on a hardware platform 248 which may have an instrumented execution environment 252 on which an application 250 may execute. The instrumented execution environment 252 may be an operating system, system virtual machine, process virtual machine, or other software component that may execute the application 250 and provide a tracer 254 or other instrumentation that may collect data during execution.

The tracer 254 may receive trace objectives 256 from the dispatcher 230. The tracer 254 may evaluate and execute the trace objectives 256 to collect input data and tracer results, then transmit the input data and tracer results to the data collector 234.

In some embodiments, a single tracer 254 may have multiple trace objectives 256 that may be processed in parallel or at the same time. In some such embodiments, a dispatcher 230 may identify two or more trace objectives 256 that may not overlap each other. An example may include a first trace objective that gathers data during one type of operation and a second trace objective that gathers data during another type of operation, where the two operations may not occur at the same time. In such an example, neither trace objective would be executing while the other tracer object were executing.

In another example, some trace objectives 256 may be very lightweight in that the trace objective may not have much impact or cost on the instrumented systems 246. In such cases, the dispatcher 230 may send several such low cost or lightweight trace objectives 256 to the instrumented systems 246.

In some embodiments, the trace objective generator 226 may create trace objectives that may be sized to have minimal impact. Such trace objectives may be created by estimating the cost impact on an instrumented system 246. The cost impact may include processing, input/output bandwidth, storage, memory, or any other impact that a trace objective may cause.

The trace objective generator 226 may estimate the cost impact of a proposed trace objective, and then split the trace objective into smaller, independent trace objectives when the cost may be above a specific threshold. The smaller trace objectives may also be analyzed and split again if they may still exceed the threshold.

Such embodiments may include a cost analysis, performance impact, or other estimate with each trace objective. In such embodiments, a dispatcher 230 may attempt to match trace objectives with differing cost constraints. For example, a dispatcher 230 may be able to launch one trace objective with high processing costs with another trace objective with little processing costs but high storage costs. Both trace objectives together may not exceed a budgeted or maximum amount of resource consumption.

The analyzer 232 may create profile models of the tracer results and input stream 236. The profile models may be a mathematical or other expression that may predict an object's behavior based on a given set of inputs. Some embodiments may attempt to verify profile models by exercising the models with real input data over time to compare the model results with actual results.

Some such embodiments may use a monitoring system to evaluate profile models. A monitoring manager 240 may dispatch the models to various systems with monitoring 256. The systems with monitoring 256 may have a hardware platform 258 on which an execution environment 260 may run an application 262. A monitor 264 may receive configurations 266 which may include profile models to evaluate.

The monitor 264 may be a lightweight instrumentation system. In many cases, the systems with monitoring 256 may be production systems where the monitor 264 may be one component of a larger systems administration and management system. The monitor 264 may evaluate a profile model to generate an error statistic. The error statistic may represent the difference between a predicted value and an actual value. When the error statistic is high, the profile model may be reevaluated by creating a new or updated trace objective. When the error statistic is low, the profile model may be used to represent the observed data with a high degree of confidence.

The architecture of embodiment 200 illustrates two different types of systems that may execute an application. The systems with monitoring 256 may represent production systems on which an application may run, while the instrumented systems 246 may be specialized systems that may have additional data collection features. In some cases, the instrumented systems 246 may be the same or similar hardware as the systems with monitoring 256, and may be specially configured. In still other embodiments, the two types of systems may be identical in both hardware and software but may be used in different manners.

In some embodiments, the various components that may generate tracing objectives may also be deployed on the same device that may execute the traced application and collect the results. In some such embodiments, some components may be allocated to certain processors or other resources while other components may be allocated to different resources. For example, a processor or group of processors may be used for executing and tracing an application, while other processors may collect and analyze tracer results. In some cases, a tracer objective may execute on one processor and monitor the operations of an application executing on a different processor.

Figure 3:
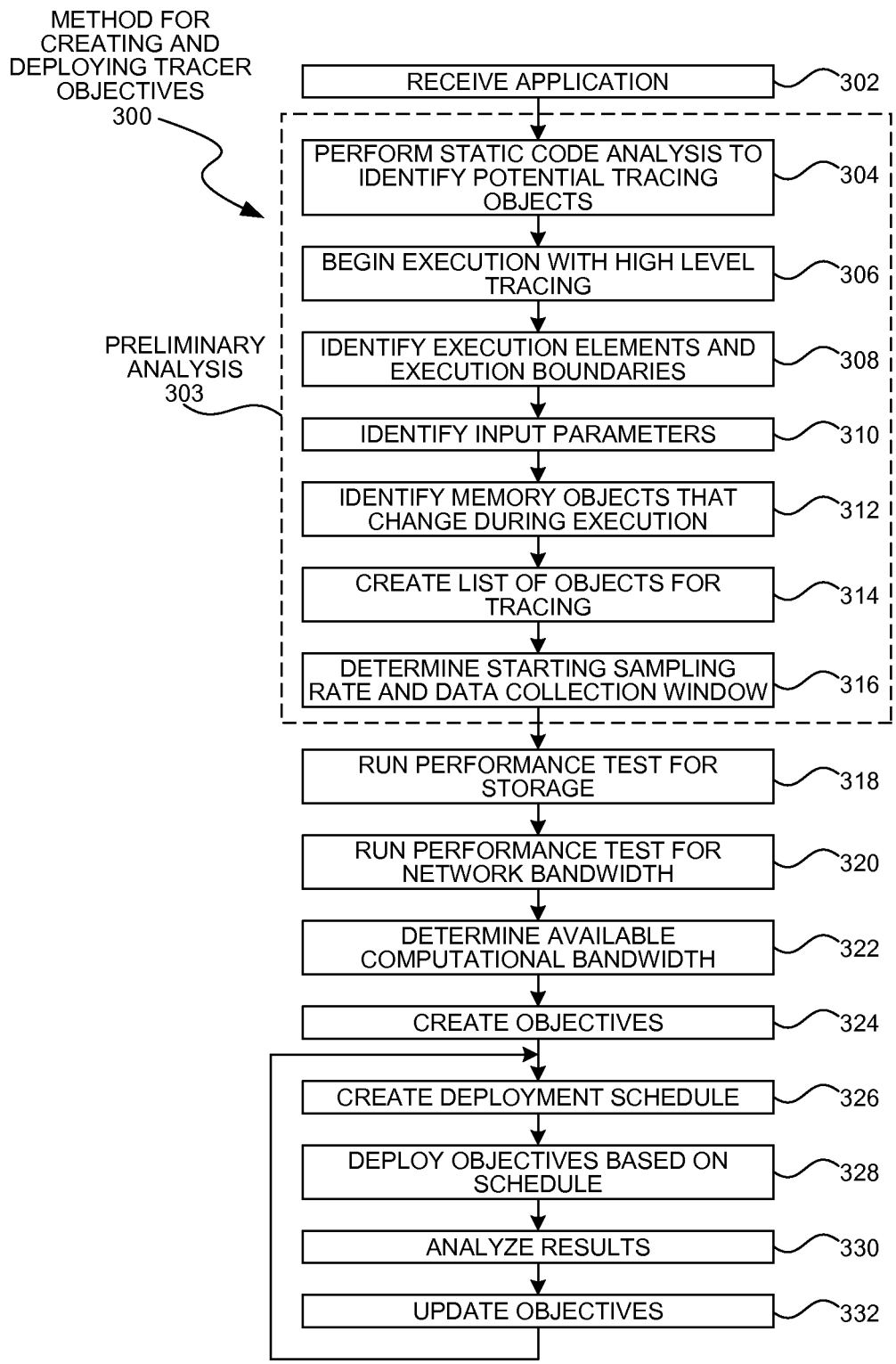
FIG. 3 is a flowchart illustration of an embodiment showing a method for creating and deploying objectives.

FIG. 3 is a flowchart illustration of an embodiment 300 showing a method for creating and deploying trace objectives. Embodiment 300 illustrates the operations of a device 202 as illustrated in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a general method by which trace objectives may be created and deployed. Some of the components of embodiment 300 may be illustrated in more detail in other embodiments described later in this specification.

Embodiment 300 illustrates a method whereby static code analysis and an initial tracing operation may identify various objects for tracing. In some embodiments, the initial tracing operation may identify enough information from which tracing objectives may be created. In other embodiments, an initial tracing operation may identify objects for tracing, then a second initial tracing operation may be performed for each of the objects. The second initial tracing operation may collect detailed data that may be too cumbersome or impractical to gather for many objects in a single tracing operation.

An application may be received in block 302 for evaluation. In block 303, the application may undergo preliminary analysis. The preliminary analysis may gather various information that may be used to automatically create a set of tracer objectives. The tracer objectives may be iterated upon to converge on statistically relevant input parameters that may affect a monitored parameter. The preliminary analysis of block 303 may gather objects to monitor as well as operational limits that may be used to create tracing objectives.

The preliminary analysis may also include periodicity analysis that may be used to set sampling rates and data collection windows for objectives. The sampling rates and data collection windows may be adjusted over time as additional data are collected and analyzed.

Static code analysis may be performed in block 304 to identify potential tracing objects. Static code analysis may identify functions and other executable code elements, memory objects and other storage elements, and other items.

In some embodiments, static code analysis may also generate relationships between executable code elements and memory objects. An example of relationships may include flow control graphs that may show causal or communication relationships between code elements. In many cases, memory objects may be related to various code elements.

High level tracing may be performed in block 306. High level tracing may help identify objects for tracing as well as gather some high level performance or data characteristics that may be used later when generating trace objectives.

During execution with high level tracing, execution elements and execution boundaries may be identified in block 308. The execution elements may be functions, libraries, routines, blocks of code, or any other information relating to the executable code. Execution boundaries may refer to performance characteristics such as amount of time to execute the identified portions of the application, as well as the expected ranges of values for various memory objects. The execution boundaries may include function calls and returns, process spawn events, and other execution boundaries.

Causal relationships may be identified between components in block 308. Causal relationships may be cause and effect relationships where one object, function, condition, or other input may cause a function to operate, a memory object to change, or other effect. Causal relationships may be useful in identifying or gathering related objects together for instrumentation.

Input parameters may be identified in block 310. The input parameters may include any inputs to the application, including data passed to the application, input events, or other information that may cause behaviors in the application. In some embodiments, the various execution elements may be analyzed to identify input parameters that may be directed to specific execution elements.

The high level tracing may identify various memory objects that may change during execution in block 312. The memory objects may represent objects for which a trace objective may be created, which may be added to a list of possible objects for tracing in block 314.

While the high level tracing executes, any periodicities or repeating patterns may be identified in block 316. Many applications operate in a repeating fashion, and often have multiple periodicities. For example, a retail website application may have a seasonal periodicity where the workload increases near holidays, as well as a weekly periodicity where the workload predictably varies over the day of week. The same application may experience repeatable changes for the hour of the day as well.

When the periodicities of an application may be known, the data collection windows for a tracer object may be set to capture multiple cycles of a period. Data that captures multiple cycles may be used to generate profile models that include a factor that takes into account periodicity. When the data collection window does not collect enough data to capture the periodicity, a profile model may generate more errors, making the model less reliable and repeatable.

Several performance tests may be performed, including storage tests in block 318, network bandwidth in block 320, and available computational bandwidth in block 322. The performance tests may be performed under the same or similar conditions as the trace objectives may be run. For example, the performance tests of blocks 318, 320, and 322 may be executed on an instrumented system while the application is executing.

The performance tests may be used to set boundaries or thresholds for creating trace objectives that meet a maximum cost goal. In such embodiments, the performance tests may be analyzed to determine the remaining performance bandwidth while an application executes. For an application that may be compute bound, computational performance may be heavily used, but there may be excess storage and network bandwidth that may be consumed by trace objectives. In another example, an application may be network or input/output bound, leaving excess computation free for use by trace objectives.

In many cases, a budget or goal may be defined for the cost of tracing. For example, a goal may be set to use up to 10%, 20%, 50%, or some other value of system resources for tracing uses. When such a goal may be set, trace objectives may be created small enough and lightweight enough to meet the goal, and the trace objectives may be dispatched or scheduled to meet the goal.

The allocation of tracing resources may be useful when an application performs time sensitive operations, or when the tracing may be focused on performance monitoring or optimization. By allocating only a maximum amount of resources, the application may not be adversely affected by excessive tracing.

In block 324, trace objectives may be created. Examples of more detailed methods for creating trace objectives are provided later in this specification. Deployment objectives may be created in block 326 to generate a deployment schedule, and the objectives may be deployed in block 328.

As the objectives are deployed, results may be received and analyzed in block 330. The analysis may identify changes to be made to a trace objective, such as changes to the sampling rate or data collection window from periodicity analysis or changes to collecting certain input data streams. Such changes may cause the tracer objectives to be updated in block 332 and redeployed at block 326.

Figure 4:
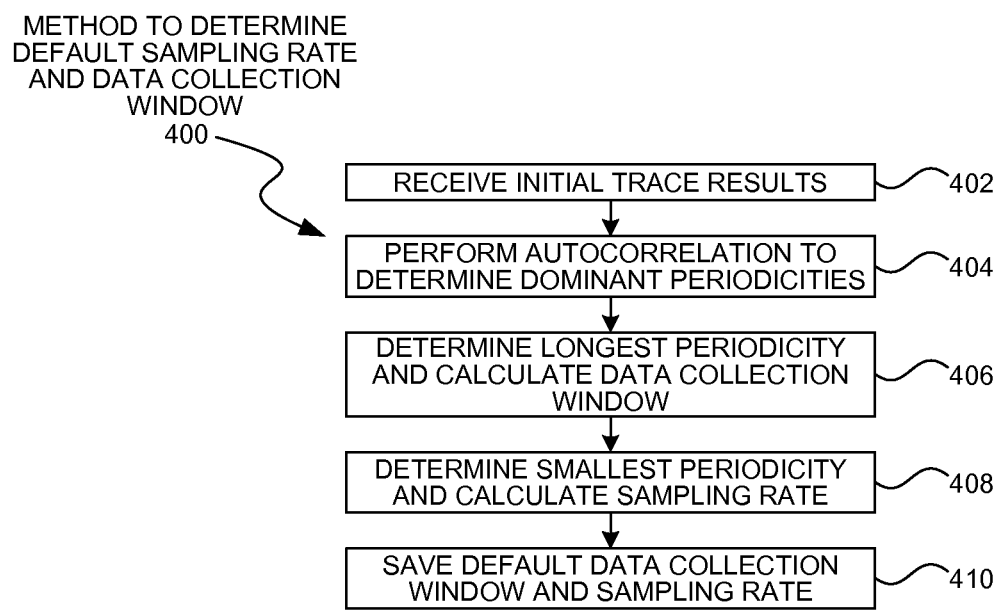
FIG. 4 is a flowchart illustration of an embodiment showing a method for determining a default sampling rate and data collection window.

FIG. 4 is a flowchart illustration of an embodiment 400 showing a method for determining a default sampling rate and data collection window. Embodiment 400 illustrates some operations of a device 202 as illustrated in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method for determining an initial set of settings for sampling rate and a data collection window for tracer objectives. In general, a sampling rate for a time series may reflect the highest frequency that may be observed in a data stream. As a sampling rate becomes faster and the time slices of a data sample become shorter, the data may capture higher frequencies. As the sampling rate decreases, the higher frequencies may not be detectable in the data stream and may add to observed noise.

A data collection window may define the longest frequency that may be observed in a time series data set. In general, a statistically significant sample size may be at least two or three times the period of the longest period within the data. A data collection window that is smaller than the longest period within the data may result in a data set that contains observed noise.

The operations of embodiment 400 may be used to set an initial sampling rate and data collection window that may be applied as a default to tracer objectives. Once the tracer objectives have been deployed and their resulting data analyzed, changes may be made to the sampling rate and data collection window.

Initial trace results may be received in block 402. The initial trace results may come from a preliminary trace of an application. The preliminary trace may identify several parameters to measure and several input streams to capture. In many cases, the preliminary trace may be performed with little or no knowledge of the application.

An autocorrelation analysis may be performed in block 404 to identify dominant periodicities in the data. The periodicity analysis of block 404 may identify multiple frequencies that may be contained in the data. Some of the frequencies may have a stronger influence than other frequencies.

A long frequency may be identified in block 406 and may be used to determine a default data collection window. A data collection window may define a length of time that time series samples may be taken. In general, a data collection window may be selected to be two, three, or more times the length of the longest period or frequency.

A small periodicity may be identified in block 408 and used to determine a default sampling rate. The default sampling rate may be short enough that the smallest frequency may be captured by 5, 10, or more samples.

The default data collection window and sampling rate may be stored in block 410. The default data collection window and sampling rate may be used as a starting point for a tracer objective. In many cases, the data collection window and sampling rate may be adjusted after analyzing more detailed data.

In some embodiments, a default sampling rate and data collection window may be set to be related to each other. For example, a default sampling rate may be set using a dominant frequency of initial data, then a default data collection window may be set to be a predefined multiple of data samples. In one such example, a default data collection window may be set to be 10,000 times the length of a default sampling window, which may result in 10,000 sets of time series data for analysis.

In another example, a default data collection window may be determined by a relatively long dominant frequency, and a sampling rate may be determined to yield a predefined number of samples. In one such example, a default data collection window may be set to be an hour, and a sampling rate may be set to be 0.36 seconds to yield 10,000 samples per run.

Figure 5:
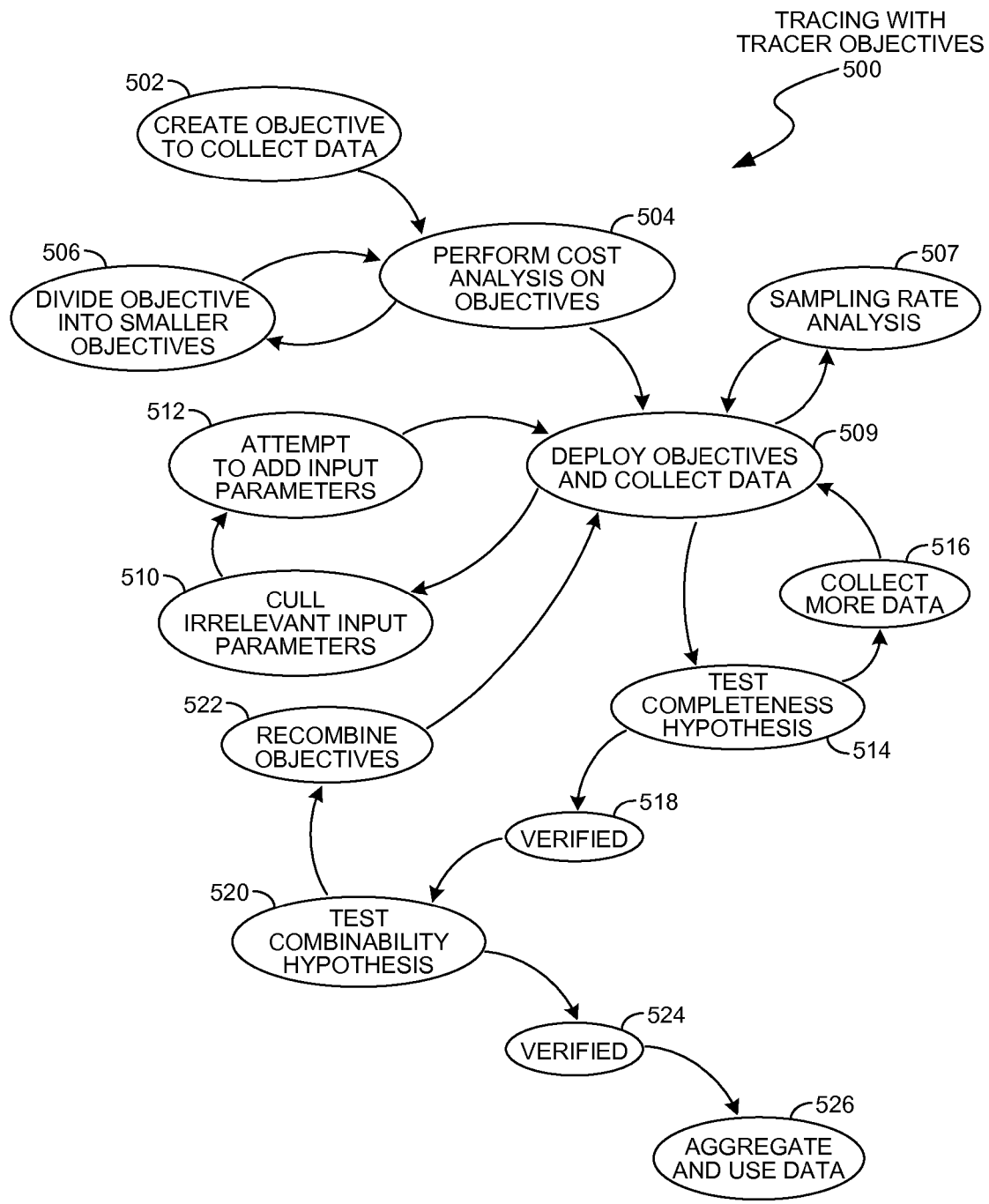
FIG. 5 is a diagram illustration of an embodiment showing tracing with tracer objectives.

FIG. 5 is a diagram illustration of an embodiment 500 showing a high level process for creating individual trace objectives then aggregating the collected data. The process of embodiment 500 creates independent trace objectives that may be deployed and optimized using several optimization analyses. Once the trace objectives have converged on statistically meaningful results, the results from multiple trace objectives may be aggregated.

A set of initial trace objectives may be analyzed, improved, and iterated to converge on statistically meaningful results. Embodiment 500 may represent an automated methodology for tracing an arbitrary application by using small, independent tracer objectives. The trace objectives may be divided, split, or otherwise made small enough to meet a tracer budget, then the trace objectives may be independently run and evaluated.

An overall objective to collect trace data may be defined in block 502. A cost analysis may be performed in block 504 to determine if the trace objective may be achieved. When the trace objective exceeds a set of cost goals, the objective may be divided in block 506 into smaller objectives, which may again be evaluated by the cost analysis in block 504. The iterative process of blocks 504 and 506 may result in multiple trace objectives that meet a cost goal.

The cost goals may be a mechanism to create tracer objectives that may be sized appropriately for a given application and a given scenario. By sizing a tracer objective so that the tracer objective does not exceed a cost goal, any negative influence of the tracer objective may be minimized during data collection.

Several different tracing scenarios may be supported. In one scenario, an application may be deployed on a large number of devices. One example may be a website that may be deployed on several servers in a datacenter, where all of the servers operate as a cluster to handle incoming web requests in parallel. In such an example, the performance of the servers may be more accurately measured when the tracer objectives are relatively small and consume few resources.

In another example, an application for a cellular telephone platform may be deployed on a large number of handheld devices. A tracing scenario may have each device perform a tracer objective that may consume only a limited amount of resources. The cost-based analysis of tracer objectives may ensure that the handheld devices may not be overwhelmed by the tracing workload.

The trace objectives may be evaluated for sampling rate and frequency analysis in block 507. The sampling rate and frequency analysis may examine data patterns to identify periodicities to identify which periodicities are dominant. The dominant periodicities may be used to adjust the sampling rate and data collection window to capture the periodicities accurately. In some cases, a hypothesis of an initial sampling rate and data collection window may be tested by changing the sampling rate and data collection window to search for other dominant frequencies in the data.

As the objectives are deployed in block 509 and data are collected, the data may be analyzed in several different manners. For each tracer objective, an input stream may be collected along with measured results. In block 510, the input stream may be culled to remove those input parameters or values that have statistically small or insignificant contributions to predicting the results. In block 512, other input parameters may be added to a tracer objective. The process may iterate between blocks 509, 510, and 512 until the input parameters that are statistically meaningful to predicting a measured result converge.

When examining a tracer objective to attempt to add input parameters in block 512, related objects may be examined. The related objects may be objects identified from static code analysis, such as from a control flow graph or other relationship. In some cases, trace results that have similar periodicities may be examined to evaluate different parameters in an input stream.

The result of the iteration of blocks 509, 510, and 512 may result in a mathematical model that may predict tracer results given a set of input parameters. Each tracer objective may generate a separate mathematical model.

The results may be analyzed for completeness in block 514. A completeness hypothesis may posit that the full range of input conditions may have been experienced by the tracer objectives. The hypothesis may be tested in block 514 by comparing the input streams experienced by different runs of the same trace objective, and in some embodiments, by comparing runs of different tracer objectives. When the hypothesis may not be validated, more data may be collected in block 516.

When the completeness hypothesis may be validated in block 518, a combinability hypothesis may be tested in block 520. The combinability hypothesis may posit that two models created from different tracer objectives may be combined into a larger model. The combinability hypothesis may be tested by joining two predictive models and testing the results of the combined model using previously collected data or by testing the results against real time data.

When the joined models do not yield a statistically meaningful result, a new tracer objective may be created in block 522 that combines the two tracer objectives. The resulting data collection and analysis may result in a different model than the combined model initially tested for the combinability hypothesis.

The combinability hypothesis may be tested for some or all of the tracer objectives. When the hypothesis may be verified in block 524, the collected data may be aggregated in block 526.

The aggregated data may be used in many different scenarios. In a debugging and testing scenario, the aggregated data may be used by a developer to understand program flow and to highlight any performance bottlenecks or other abnormalities that may be addressed. In an optimization scenario, the aggregated data may be used by an automated or semi-automated optimizer to apply different resources to certain portions of an application, for example.

Figure 6:
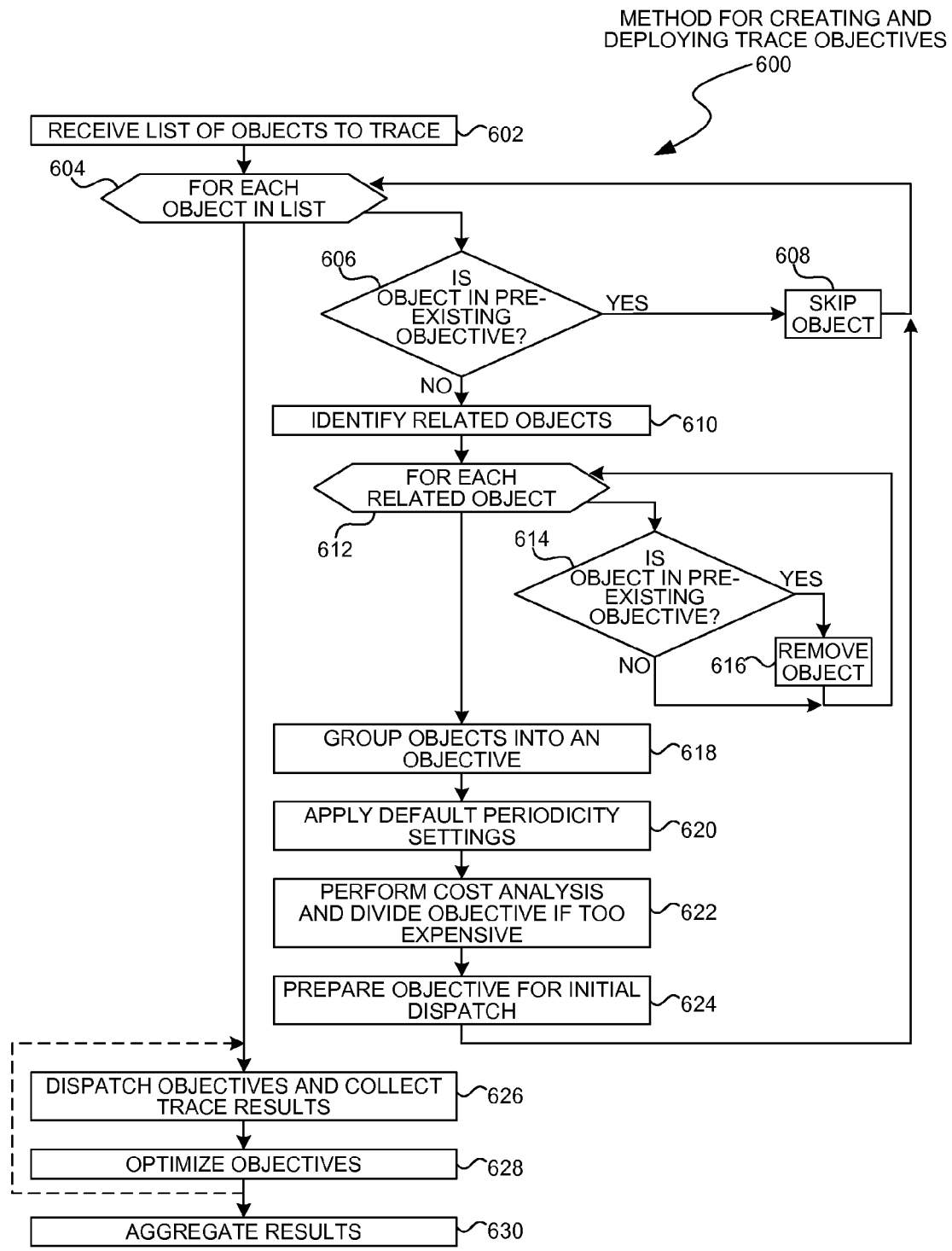
FIG. 6 is a flowchart illustration of an embodiment showing a method for creating and deploying trace objectives.

FIG. 6 is a flowchart illustration of an embodiment 600 showing a method for creating and deploying trace objectives.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates a method that creates tracer objectives by assigning various objects to tracer objectives. The tracer objectives may undergo a cost analysis that may cause the tracer objectives to be divided into smaller tracer objectives, then the tracer objectives may be dispatched.

Embodiment 600 illustrates a method that may be fully automated to begin an iterative method for tracing an application. The iterative method may create small, independent tracer objectives that may be deployed and iterated upon to converge on a set of statistically valid tracer models that may reflect how the application performs. The method may be performed on an arbitrary application and may automatically generate a meaningful understanding of an application without human intervention. In some embodiments, human intervention may be used at different stages to influence or guide the automated discovery and analysis of an application.

In block 602, a list of objects to trace may be received. The list of objects may be identified through static code analysis or other preliminary analysis. An example of such analysis may be found in block 303 of embodiment 300.

For each object in the list of objects in block 604, if the object is contained in another tracer objective in block 606, the object may be skipped in block 608. When the object is not in a pre-existing tracer objective in block 606, related objects may be identified in block 610.

Related objects may be any other objects to trace that may be suitable for inclusion in a single tracer objective. For example, an object to trace may be a memory object. The memory object may be set by a function, so the function may be added to the tracer objective. Other functions may read the memory object, so those functions may be added as well.

In the example, the function that may set the memory object may have a stronger relationship to the memory object than the functions that may read the memory object. Later in the process, objects with a weaker relationship may be removed from the tracer objective when the tracer objective may be too costly or burdensome to execute. Those objects that may be removed from a tracer objective may be added back to the list of objects.

For each related object in block 612, if the related object is already in a pre-existing tracer objective in block 614, the object may be removed in block 616.

The process of blocks 606 through 616 may be one method to gather related objects into tracer objectives, but not duplicate efforts by tracing the same object in multiple tracer objectives. The example of blocks 606 through 616 may assign objects to tracer objectives to maximize coverage with a minimum number of tracer objectives.

With each object to be traced, a set of performance parameters may be identified. In many cases, a template of tracer objectives may include measurable parameters that relate to a certain type of object. For example, a memory object may be traced by measuring the number of changes made, number of accesses, and other measurements. In another example, a function or other block of executable code may be traced by measuring speed of completion, error flags thrown, heap allocation and usage, garbage collection frequency, number of instructions completed per unit time, percentage of time in active processing, percentage of time in various waiting states, and other performance metrics. In yet another example, a message interface may be traced by measuring the number of messages passed, payload of the messages, processing time and communication bandwidth allocated to each message, and other parameters.

Other embodiments may create tracer objectives that have overlapping coverage, where a single object may be traced by two or more different tracer objectives. Such embodiments may be useful when more resources may be devoted to tracing.

After grouping the objects for a tracing objective in block 618, a set of default periodicity settings may be applied in block 620. A cost analysis may be performed in block 622. In some cases, two or more objectives may be created from a single tracer objective. An example of such a method may be found later in this specification.

The tracer objective may be prepared for initial dispatch in block 624. Such preparation may define a communications configuration that may define how a tracer may communicate with a data gatherer. The communication configuration may include an address for a data gatherer, as well as permissions, protocols, data schemas, or other information.

The tracer objectives may be dispatched in block 626 and results collected. The tracer objectives may be optimized in block 628 by removing statistically insignificant input parameters and searching for potentially significant input parameters.

After looping through blocks 626 and 628, the results may be aggregated in block 630.

Figure 7:
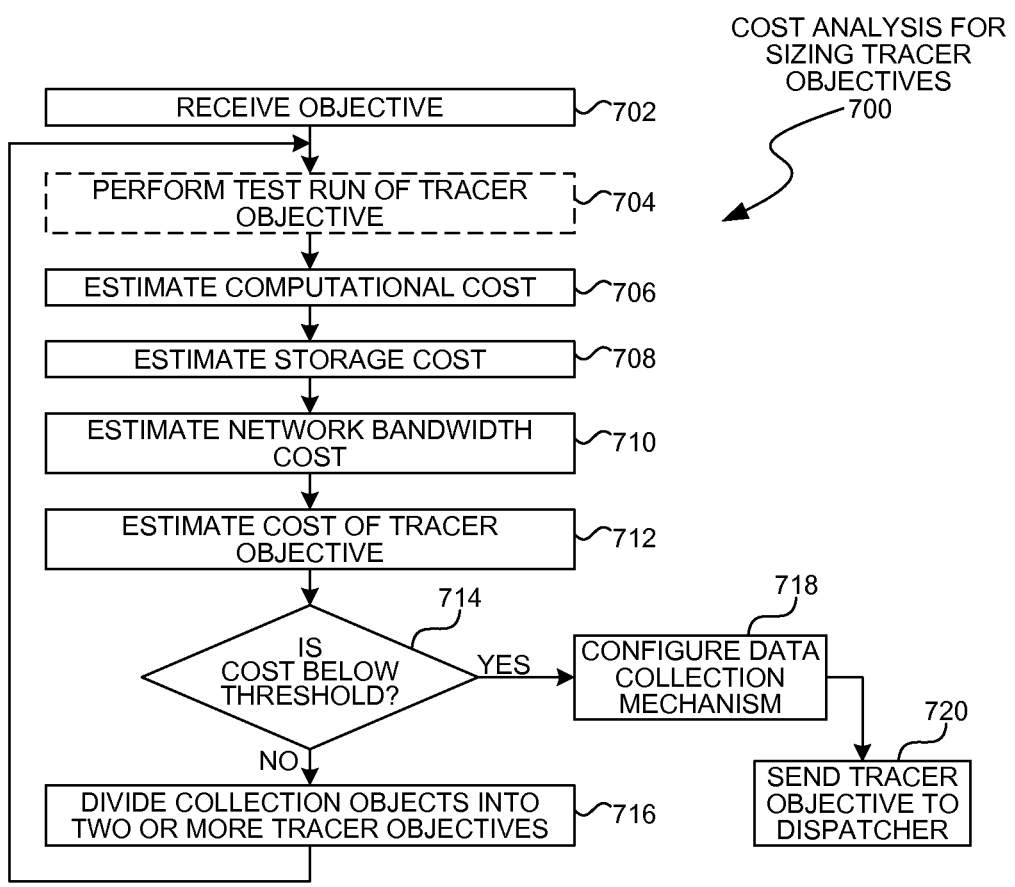
FIG. 7 is a flowchart illustration of an embodiment showing a method for sizing tracer objectives using cost analysis.

FIG. 7 is a flowchart illustration of an embodiment 700 showing a method for performing cost analysis on tracer objectives. Embodiment 700 may illustrate one example of a process that may be performed in block 622 of embodiment 600.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates a method by which a tracer objective may be evaluated for cost impact and divided into smaller tracer objectives. The cost impact may be the resource consumption of a tracer objective. In some embodiments, the cost may be translated into a financial cost, while in other embodiments the cost may be in terms of resources consumed by a tracer objective. Embodiment 700 is an example of the latter type of cost analysis.

Embodiment 700 uses three different cost computations: performance cost, storage cost, and network bandwidth cost. Such an embodiment is an example of a cost analysis that may have multiple, independent cost functions to satisfy. Other embodiments may have more or fewer cost functions to evaluate.

An objective may be received in block 702.

In some embodiments, a test run may be performed using the tracer objective in block 704. In such embodiments, the performance of a tracer may be measured to estimate the cost components. In other embodiments, a static code analysis may be performed of the tracer objective to determine the various cost components.

An estimate of the computational cost may be performed in block 706. An estimate of the storage cost may be performed in block 708, and an estimate of the network bandwidth cost may be performed in block 710. The overall cost of the tracer objective may be determined in block 712.

Computational cost or processor cost may reflect the amount of processor resources that may be incurred when executing a tracer objective. In many cases, a tracing operation may be substantially more complex than a simple operation of an application. For example, some tracers may incur 10 or more processor steps to analyze a single processor action in an application.

Storage costs may reflect the amount of nonvolatile or volatile memory that may be consumed by a tracer objective. In many cases, a tracer objective may collect a large amount of data that may be stored and processed. The storage costs for a tracer objective may be very large in some cases, which may limit performance.

Network bandwidth costs may be the resources consumed in transmitting collected data to a data repository. The network resources may include operations of a network interface card, network connection, and other network related resources. As larger amounts of data may be moved across a network connection, a network connection may become saturated and cause disruption to other communications.

When the cost is above a predefined threshold in block 714, the objective may be divided into two or more smaller tracer objectives in block 716. An example of such a process may be illustrated in another embodiment described later in this specification.

When the cost is below the predefined threshold in block 714, a data collection mechanism may be configured for the tracer objective in block 718 and the tracer objective may be sent to a dispatcher in block 720.

The data collection mechanism of block 718 may define how the data may be collected. In some embodiments, the data collection mechanism may include a destination device description that may collect data, as well as any communication parameters or settings.

Figure 8:
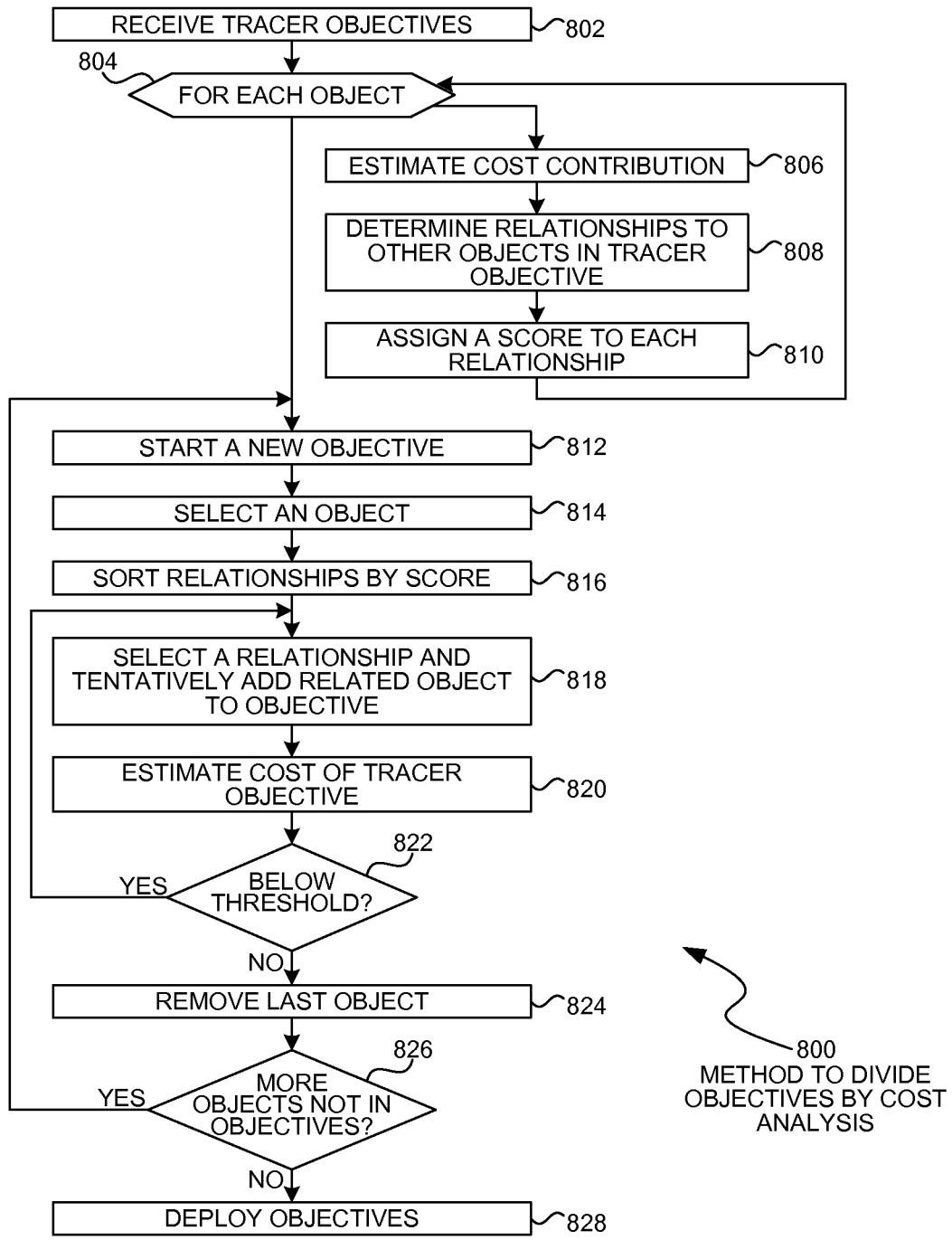
FIG. 8 is a flowchart illustration of an embodiment showing a method for dividing tracer objectives using cost analysis.

FIG. 8 is a flowchart illustration of an embodiment 800 showing a method for dividing tracer objectives into smaller tracer objectives. Embodiment 800 may illustrate one example of a process that may be performed in block 716 of embodiment 700.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 illustrates one method by which a tracer objective may be trimmed to meet a cost objective. Embodiment 800 illustrates merely one method by which a tracer objective may be made smaller using an automated process. In embodiment 800, objects may be sorted based on a strength of relationship, then objects with stronger relationships may be consolidated into a tracer objectives. Any remaining objects may be recycled into a new tracer objective.

A tracer objective may be received in block 802.

For each object in the tracer objective in block 804, a cost contribution of the object may be estimated in block 806. The cost contribution may be the cost of tracing that object.

Relationships of the object to other objects within the trace objective may be identified in block 808 and the relationships may be scored in block 810. The scoring may reflect a strength of a relationship.

A new objective may be started in block 812 with a starting object in block 814. Relationships between the object and other objects may be sorted by score in block 816. The sorting may result in the strongest relationships being analyzed first.

A relationship may be selected in block 818 and tentatively added to the tracer objective. The cost of the tracer objective may be estimated in block 820. The cost estimation in block 820 may utilize the cost contribution determined in block 806. If the cost is below a threshold in block 822, the process may return to block 818 to add another object to the tracer objective.

When the cost is above the threshold in block 822, the last object may be removed from the tracer objective. In such a situation, adding the last object may have made the trace objective go over the cost allocation, and therefore it may be removed.

When more objects are still available but have not been placed in a tracer objective in block 826, the process may return to block 812 to start a new tracer objective. When all objects have been processed in block 826, the tracer objectives may be deployed in block 828.

Figure 9:
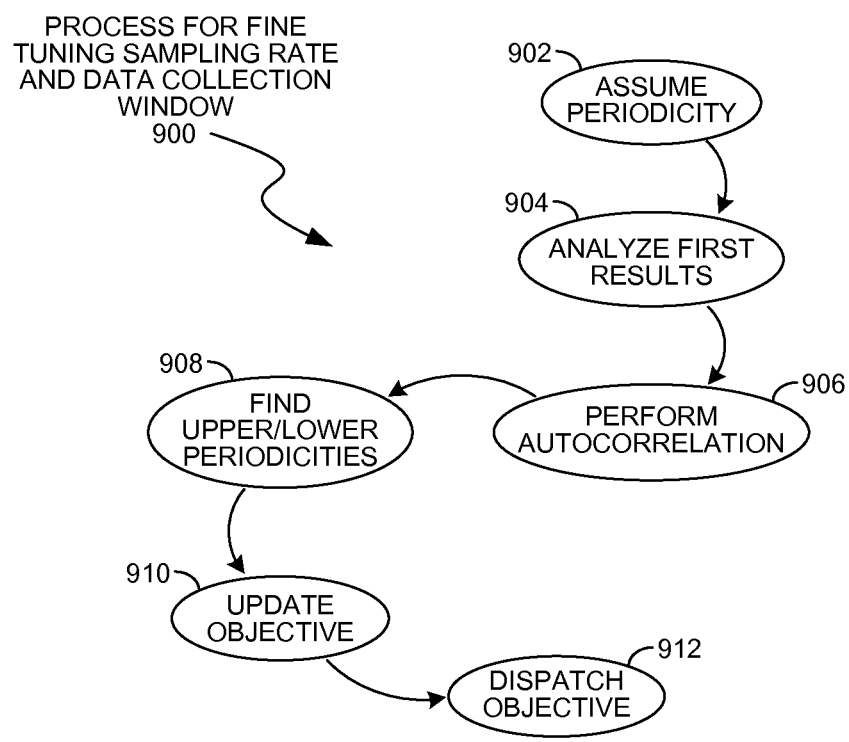
FIG. 9 is a diagram illustration of an embodiment showing a process for fine tuning sampling rates and data collection windows.

FIG. 9 is a diagram illustration of an embodiment 900 illustrating a process for tuning the sampling rate and data collection window for a tracer objective.

Embodiment 900 illustrates an example process where periodicity analysis may be used to refine a tracer objective's data collection. In some embodiments, each tracer objective may be executed using default sampling rates and data collection windows, then these parameters may be refined after looking at the actual data collected.

In block 902, a periodicity may be assumed for a tracer objective. The periodicity may be a default periodicity that may be derived from an initial analysis of an application. In many cases, the default periodicity may reflect periodic behavior of an application as a whole, whereas a tracer objective may generate data with a different set of periodic behavior. However, a first run of a tracer objective may be performed with the default periodicity as a starting point.

The first results of a tracer objective may be analyzed in block 904 by using autocorrelation in block 906, which may generate characteristic periodicities or frequencies in the data. From such analysis, dominant upper and lower frequencies may be identified in block 908.

A dominant upper frequency or shortest periodicity may be used to set a sampling rate. In many cases, a sampling rate may be set so that 5, 10, 20, or more samples may be taken within a single period of the dominant upper frequency.

Similarly, a dominant lower frequency or longest periodicity may be used to set a data collection window. In many cases, a data collection window may be set to capture at least 2, 3, 4, 5, or more instances of the longest periodicity.

After analyzing the initial run of a tracer objective, the tracer objective may be updated in block 910 and dispatched in block 912.

Figure 10:
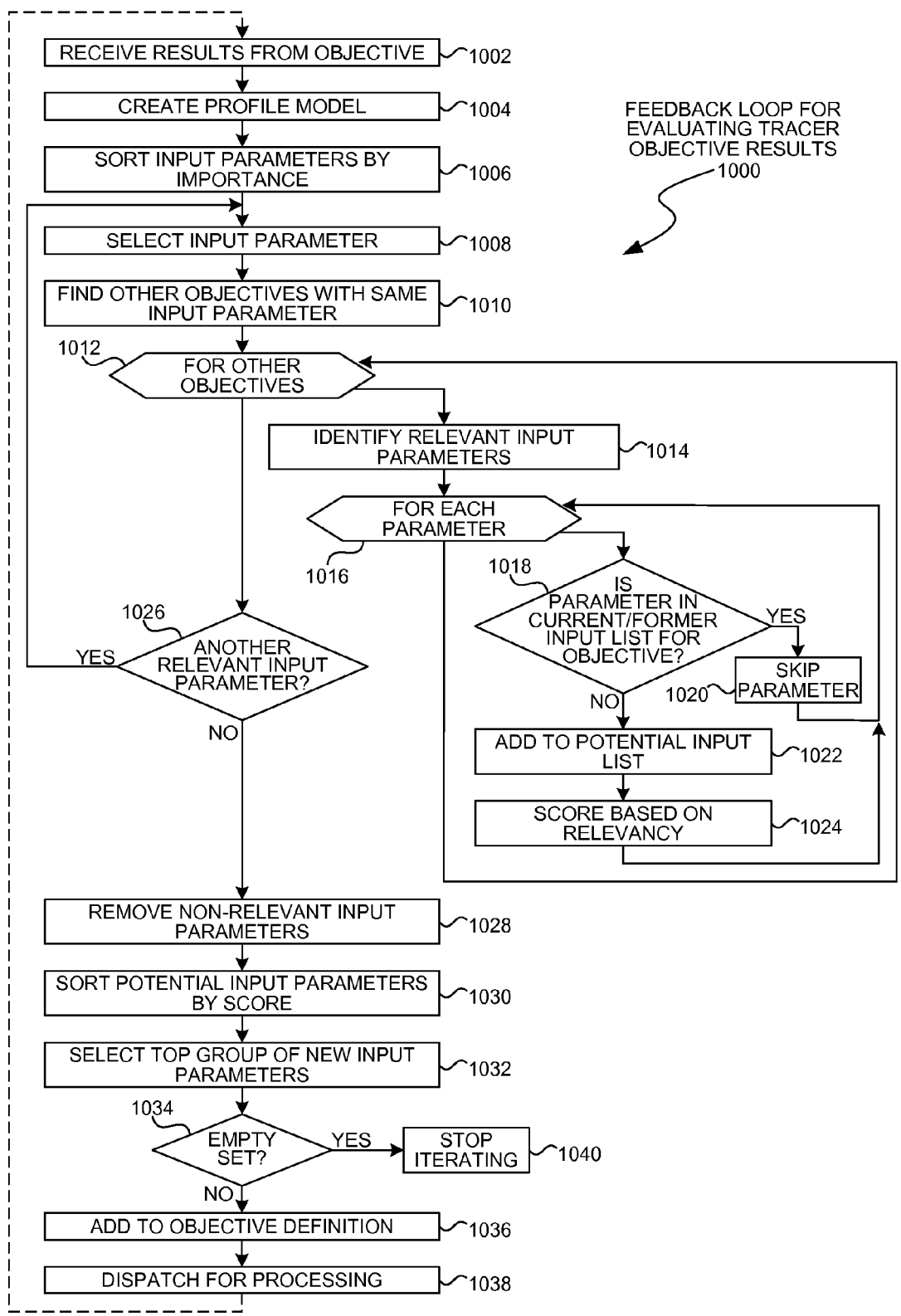
FIG. 10 is a flowchart illustration of an embodiment showing a method with a feedback loop for evaluating tracer results.

FIG. 10 is a flowchart illustration of an embodiment 1000 showing a method with a feedback look for evaluating tracer objective results. Embodiment 1000 may illustrate one example of a process that may be performed in blocks 626 and 628 of embodiment 600.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 illustrates an embodiment where the input parameters for a tracer objective may be evaluated and iterated upon to converge on a set of statistically meaningful input parameters. Embodiment 1000 may discard those input parameters that may have little statistical relationship to a measured parameter and may attempt to add new input parameters that may have a relationship to the measured object.

A results set may be received for a tracer objective in block 1002, and a profile model may be constructed of the results in block 1004. The profile model may be a mathematical expression of the relationship between the input stream and the measured results. The profile model may be created using linear or nonlinear regression, curve fitting, or any of many different techniques for expressing a set of observations. In many cases, the profile model may have correlation factors or other factors that may indicate the degree or importance of an input factor to the profile model.

The input parameters may be sorted by importance in block 1006. The first input parameter may be selected in block 1008. Other tracer objectives with the same input parameter may be identified in block 1010.

For each of the objectives identified in block 1010, the objectives may be analyzed in block 1012. The relevant input parameters may be identified in block 1014. The relevant input parameters may be any of the parameters for that tracer objective where there may be a minimum of statistical correlation to the measured parameter.

For each of the parameters in block 1016, if the parameter is in the current tracer objective, or was previously considered in the current tracer objective, the parameter may be skipped in block 1020.

If the parameter has not been examined in the current tracer objective in block 1018, the input parameter may be added to the input list in block 1022. A relevancy score may be calculated in block 1024 for the parameter.

The relevancy score may indicate the expected degree to which the parameter may be relevant to the current tracer objective. In some embodiments, the relevancy score may be a factor of the strength of relationship between the current tracer objective and the related tracer objective being examined, along with the relative importance of the input parameter to the related tracer objective.

After processing all of the parameters in block 1016 for each of the objectives in block 1012, if another relevant input parameter may be processed in block 1026, the process may return to block 1008 to add still more candidate input parameters.

In block 1028, non-relevant input parameters within the current tracer objective may be removed.

The list of potential input parameters may be sorted by score in block 1030. The list may include all of the parameters added in block 1022.

The top group of input parameters may be selected in block 1032. The top group may contain input parameters with a score above a given threshold. Provided that the group is not an empty set in block 1034, the group may be added to the tracer objective in block 1036 and dispatched for processing again in block 1038. The results of the trace objective may be used as input to block 1002.

When the set of available input parameters is an empty set in block 1034, the iteration may end in block 1040 as all of the potential input parameters may have been exhausted.

Figure 11:
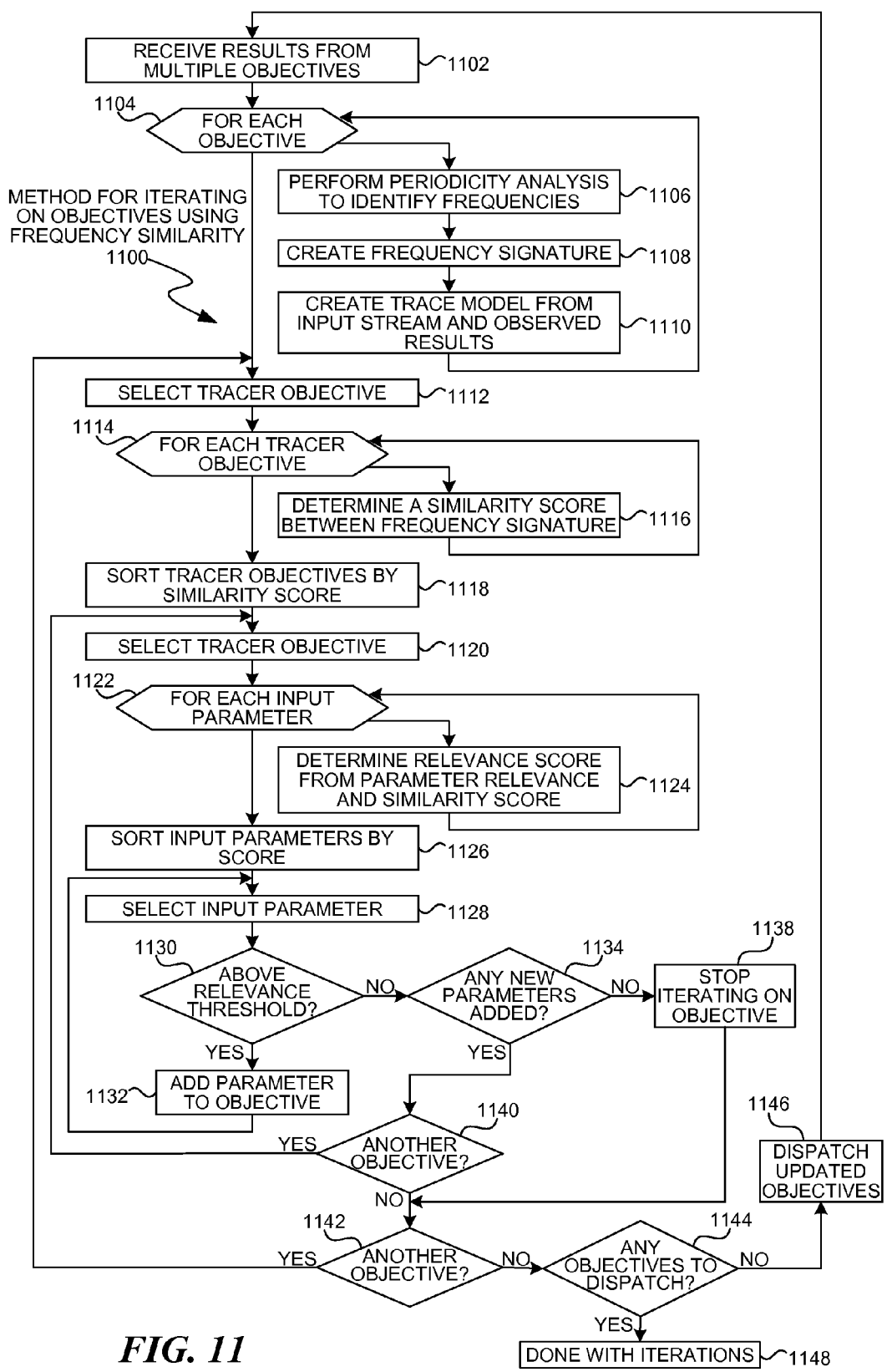
FIG. 11 is a flowchart illustration of an embodiment showing a method for iterating on objectives using frequency similarity.

FIG. 11 is a flowchart illustration of an embodiment 1100 showing a method for iterating on tracer objectives using frequency similarities. Embodiment 1000 may illustrate another example of a process that may be performed in blocks 626 and 628 of embodiment 600.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1100 may be similar to embodiment 1000 in that a tracer objective may be updated with input parameters that may have a likelihood of being statistically significant. Embodiment 1100 may gather those input parameters from periodicity analysis of various tracer objectives. Those tracer objectives with similar frequency signatures or periodicities may be candidates for having statistically relevant input parameters.

In block 1102, results from many tracer objectives may be received. For each objective in block 1104, a periodicity analysis may be performed in block 1106 to identify frequencies or periods within the data. A frequency profile or signature may be created in block 1108.

The frequency profile may include multiple frequencies and the intensity or strength of the various frequencies. The frequency profile may be used as a signature to represent the behavior of the data collected by the tracer objectives.

A tracer objective may be selected in block 1112 as a starting objective. In embodiment 1100, each tracer objective may be evaluated to attempt to find additional input parameters that may be related to a given traced object or observed data point. The process may iterate to add potential new input parameters, test the new parameters, and iterate.

In many embodiments, each iteration may include removing those input parameters that may be statistically insignificant while attempting to add input parameters that may be statistically significant.

For each tracer objective in block 1114, a similarity score may be determined by matching the frequency signatures of the objective selected in block 1112 with the tracer objectives analyzed in block 1114. The similarity score may be a statistical measurement of the correlation or similarity of the two frequency signatures.

The tracer objectives may be sorted by similarity score in block 1118. Starting with the most similar frequency signature in block 1120, each input parameter may be analyzed in block 1122 to determine a relevance score. The relevance score may take into account the similarity of the frequency signatures coupled with the relevance of the input parameter to the data collected in the tracer objective selected in block 1120. In many embodiments, a similarity score created in block 1116 may be multiplied with an influence factor for the input parameter to yield a relevance score.

The scored input parameters may be sorted by score in block 1126. A parameter may be selected in block 1128 and, when the parameter may be above a threshold in block 1130, the parameter may be added to the tracer objective and the process may loop back to 1128 to select the next parameter in the sorted list.

When a parameter does not meet the relevance threshold in block 1130 but some new parameters may have been added in block 1134 and additional objectives remain to be processed in block 1140, the process may return to block 1120 to attempt to add more input parameters from other tracer objectives.

When a parameter does not meet the relevance threshold in block 1130 and no new parameters have been added in block 1134, the iterating on the objective may be stopped in block 1138. At this stage, the process of embodiment 1100 may have not identified any new input parameters that may potentially be relevant.

After processing each objective in block 1140 to generate input parameters, when additional objectives have not undergone input parameter analysis in block 1142, the process may return to block 1112 to select another tracer objective for analysis.

After each tracer objective has been analyzed for additional input parameters in block 1142 and at least some of the tracer objectives may have been updated in block 1144, the updated objectives may be dispatched in block 1146. When no updated objectives may be available in block 1144, the iteration process may halt in block 1148.

Figure 12:
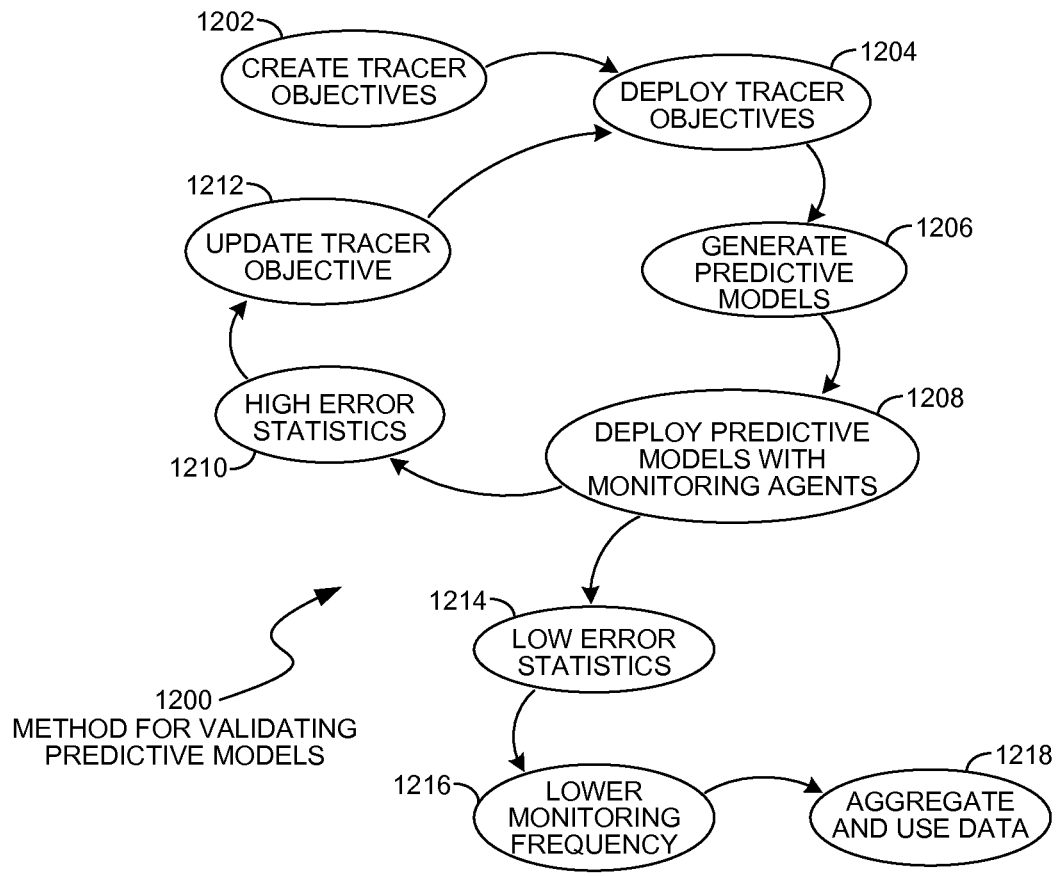
FIG. 12 is a diagram illustration of an embodiment showing a method for validating predictive models.

FIG. 12 is a diagram illustration of an embodiment 1200 showing a method for validating profile models. Embodiment 1200 illustrates a method whereby profile models may be generated using test objectives, which may be run on complex, highly instrumented devices. The models may then be validated by lighter weight monitoring systems that may be deployed on production systems.

In one use model, an application may be evaluated using a highly instrumented test environment using independent trace objectives that may capture detailed data. From the data, profile models of small elements of the application may be created. In order to test the profile models, the models may be deployed on production hardware that may or may not have the capabilities to perform detailed data collection.

In an example, a mobile telephone application may be tested using a virtualized version of a mobile telephone, where the virtualized version may execute on a desktop computer with large amounts of computational power. The data collection may be performed using trace objectives that may be executed along with the application under test. Once a profile model has been generated that may represent the data, the model may be dispatched to a production mobile phone device that may perform a very lightweight monitoring that merely tests one small profile model. Because the profile model may not consume many resources, a monitor may collect data on the mobile phone to generate an error statistic.

In block 1202, trace objectives may be created, and those objectives may be deployed in block 1204. Profile models may be generated from the resulting data in block 1206.

The profile models may be deployed to devices in block 1208, where the devices in block 1208 may have monitoring agents installed.

The profile models may have one or more input parameters and may perform a mathematical function, then return a predicted result. The monitoring agents may capture input parameters from actual usage, perform the calculations defined in the model, the compare the predictive result to the actual result. The monitoring agent may generate an error statistic that may be derived from the difference between a predictive result and an actual result.

Those models with high error statistics in block 1210 may update a trace objective in block 1212 and re-submit the trace objective in block 1204. Those models with low error statistics in block 1214 may be assumed to be accurate models and the monitoring frequency may be lowered or removed in block 1216. The models may be aggregated with other models in block 1218.

The monitors and profile models may be deployed as a general purpose monitoring system that may detect when performance, input data, or other conditions may have gone awry. In such embodiments, the profile models may be created to monitor variables or conditions that may cause substantial harm or otherwise warn of adverse conditions. Such models may be derived from the aggregated data in some cases.

Figure 13:
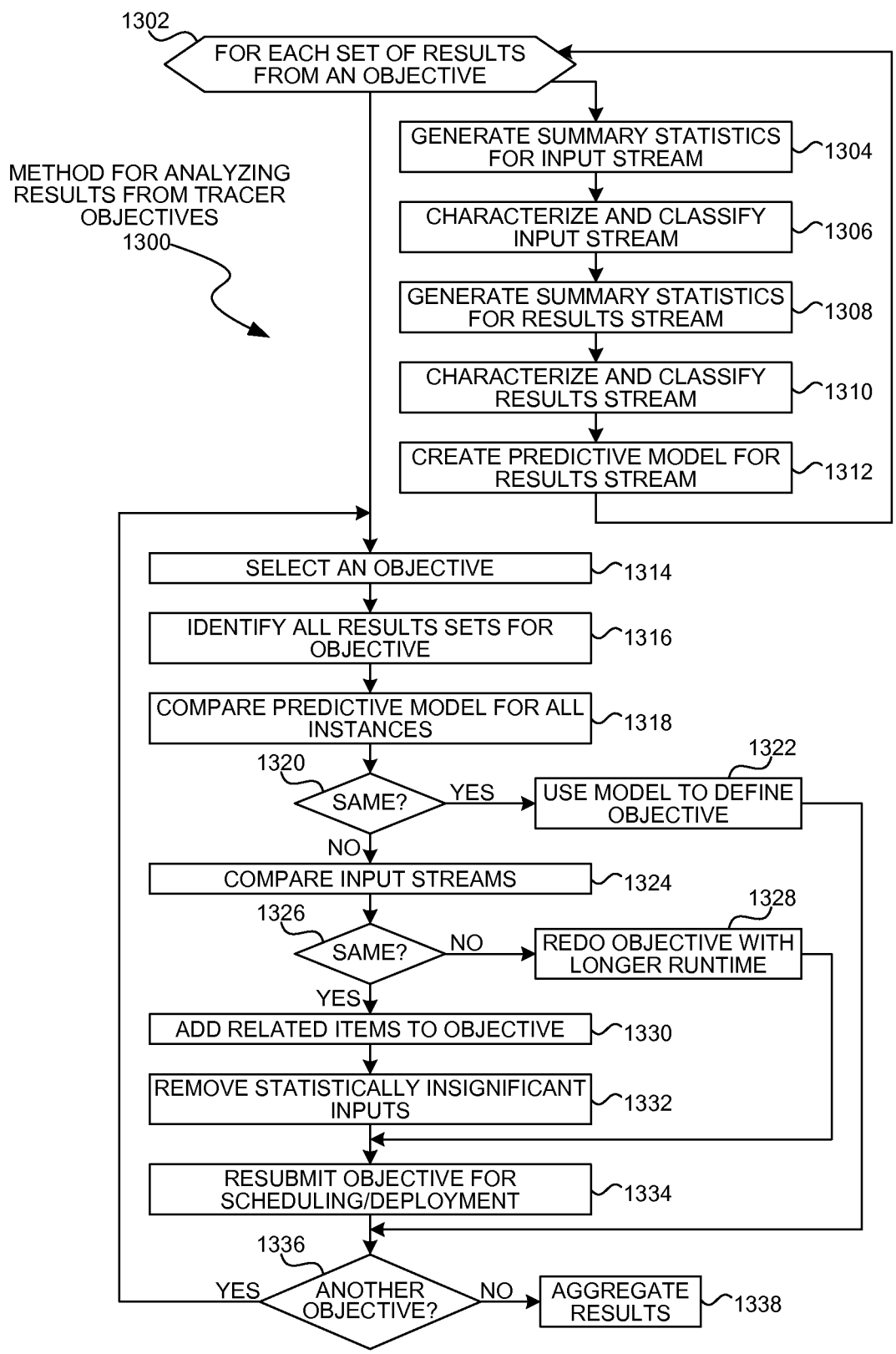
FIG. 13 is a flowchart illustration of an embodiment showing a method for analyzing results from tracer objectives.

FIG. 13 is a flowchart illustration of an embodiment 1300 showing a method for analyzing results from trace objectives.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1300 illustrates merely one example of a method for analyzing trace objective results. Embodiment 1300 illustrates an example analysis method that compares multiple trace objective results from separate instances of a trace objective. In many cases, a single trace objective may be executed multiple times, either on multiple devices a various times or on the same device but at different times. The results sets may be analyzed to determine whether or not the results may be consistent and predictable. Consistent and predictable results may be considered good results that may be aggregated with other similarly good results.

Embodiment 1300 is an example of an embodiment that may analyze the input stream and results stream separately to make decisions using each stream.

Each set of results may be processed in block 1302. For each set of results in block 1302, summary statistics may be generated for the input stream in block 1304 and the input stream may be characterized and classified in block 1306. Similarly, the results stream may have summary statistics generated in block 1308 and characterizations and classifications performed in block 1310. A profile model of the results may be created in block 1312.

The statistics generated in blocks 1304 and 1308 may be high level representations of the data. Such statistics may include averages, medians, standard deviations, and other descriptors. The characterizations and classifications performed in blocks 1306 and 1310 may involve curve fitting, statistical comparisons to standard curves, linear and nonlinear regression analysis, or other classifications.

The profile model generated in block 1312 may be any type of mathematical or other expression of the behavior of the observed data. The profile model may have input parameters that may be drawn from the input stream to predict the values of the results stream.

An objective may be selected in block 1314. All of the results set for the objective may be identified in block 1316. In some embodiments, many results sets may be generated, but the operations of embodiment 1300 may assume at least two results sets may be present for the purposes of illustration.

The profile model of each instance may be compared in block 1318. When the profile model of the instances is the same in block 1320, the model may be selected to represent the observed data. In many embodiments, the comparison of numerical values generated during profile model generation may not be exact. In such embodiments, the comparison of profile models in block 1318 may consider models similar using a statistical confidence factor, such as 0.99 or greater for example.

When the profile models are not the same in block 1320, the input streams may be compared in block 1324. When the input streams are not similar in block 1326, the objective may be re-executed in block 1328 with longer runtime.

When the input streams are not similar, one or both of the objectives may not have experienced the full range of input variations. As such, any model generated from the input streams may not fully represent the actual behavior of the application. Such a condition may occur when the data gathering window does not fully encompass at least a small number of periods, for example, where the periods may be statistically significant parameters in a profile model.

When the input streams are similar in block 1326, the profile model may be missing parameters that may be statistically significant. In block 1330, some parameters may be added to the trace objective. In some embodiments, statistically insignificant parameters may be removed from the trace objective in block 1332. The statistically insignificant parameters may be those parameters in a profile model with little or no effect on the final result.

The updated trace objective may be resubmitted for scheduling and deployment in block 1334.

If another objective can be processed in block 1336, the process may return to block 1314 to select a new objective. When no more objectives are available in block 1336, the results may be aggregated in block 1338.

Figure 14:
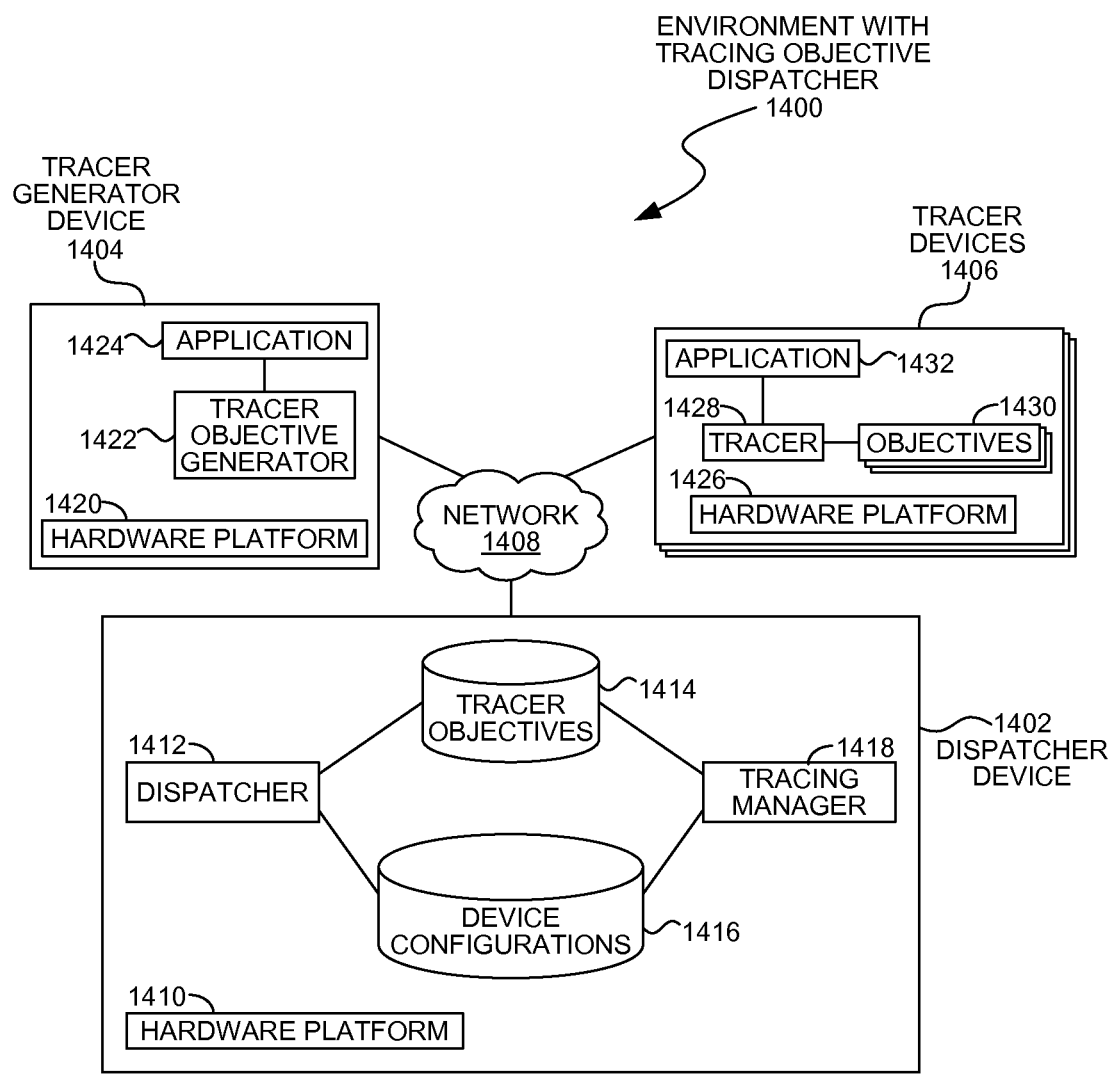
FIG. 14 is a diagram illustration of an embodiment showing an environment with a tracing objective dispatcher.

FIG. 14 is a diagram illustration of an embodiment 1400 showing a network environment with a tracing objective dispatcher. Embodiment 1400 illustrates an environment with a dispatcher device 1402, tracing generator device 1404, and a set of tracer devices 1406, all of which may be connected by a network 1408.

Embodiment 1400 may illustrate a tracing dispatcher that may match a tracing objective to a device that may execute the tracing objective. The match may be made based on the configuration of the tracing device and the estimated resource consumption of the tracing objective.

The dispatcher device 1402 may operate on a hardware platform 1410 and may have a dispatcher 1412 that may dispatch various tracer objectives 1414 to the tracer devices 1406. The dispatcher 1412 may consider the device configurations 1416 which may be collected and updated by a tracing manager 1418.

The dispatcher 1412 may place tracer objectives on devices within a tracer resource budget that may be defined for each device. The budget may identify a set of resources that may be set aside for tracing functions. As a tracing objective may be placed on a device, the tracer resource budget for the device may be updated, leaving an available resource budget.

In many cases, the set of tracer devices 1406 may have different hardware and software configurations, workloads, or other differences that may be taken into consideration when dispatching tracer objectives. A tracing manager 1418 may collect and update such device configurations 1416 on an ongoing basis.

The dispatcher device 1402 may use tracer objectives 1414 that may have been created using a tracer generator device 1404. The tracer generator device 1404 may operate on a hardware platform 1420 and may have a tracer objective generator 1422, which may create tracer objectives by analyzing an application 1424.

The tracer devices 1406 may operate on a hardware platform 1426 and have a tracer 1428 that may execute a manifest of tracer objectives 1430 against an instance of an application 1432.

Figure 15:
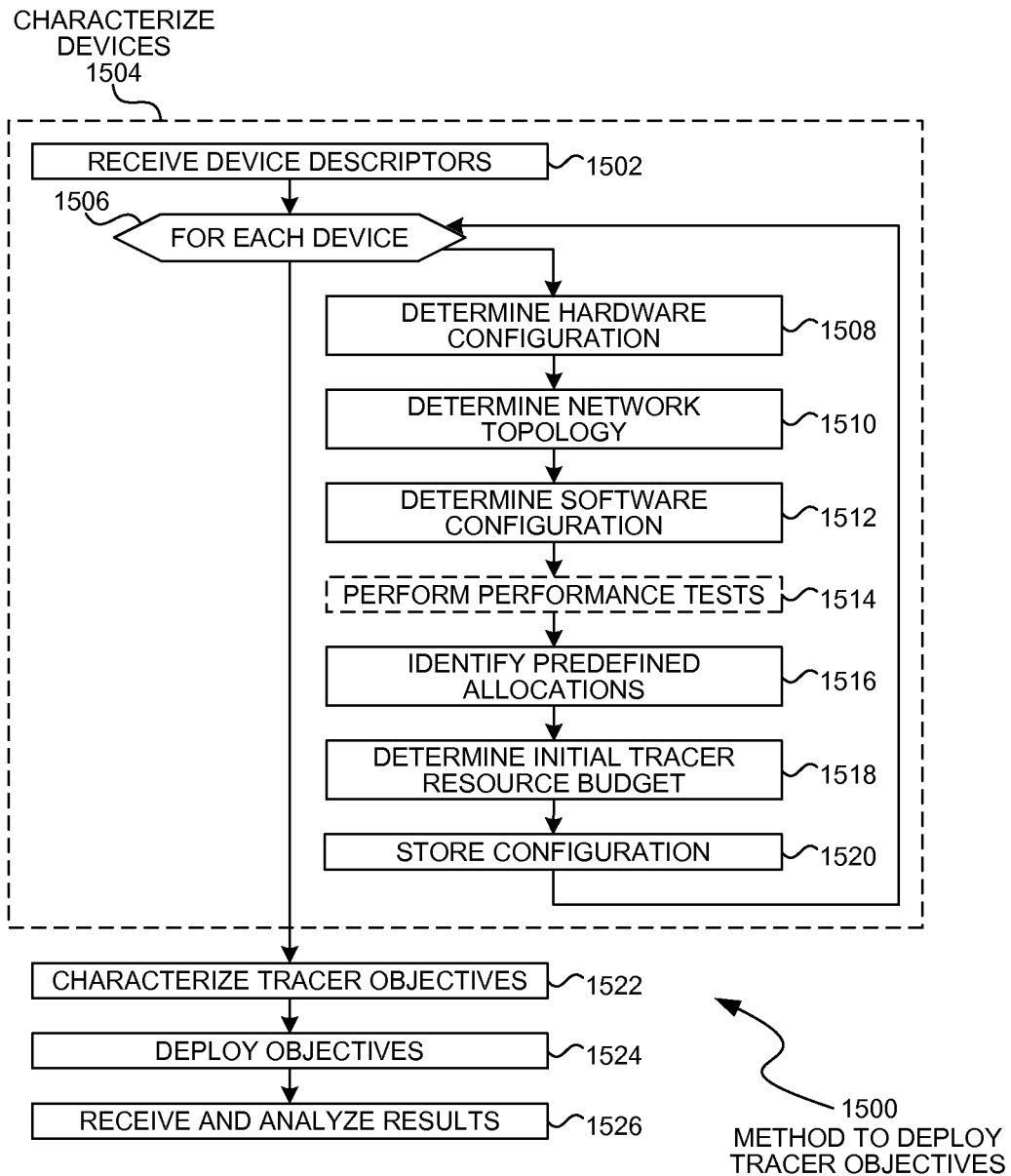
FIG. 15 is a flowchart illustration of an embodiment showing a method for deploying tracer objectives.

FIG. 15 is a flowchart illustration of an embodiment 1500 showing a method for deploying tracer objectives. Embodiment 1500 may illustrate a high level method, with a later embodiment illustrating some detailed examples of how certain portions may be implemented.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1500 illustrates a high level process that characterizes devices in block 1504, characterizes tracer objectives in block 1522, and deploys the objectives on the devices in block 1524. Embodiment 1500 illustrates one method that may be used to dispatch tracer objectives, especially one in which the tracing devices may be differently configured.

A set of device descriptors may be received in block 1502. The descriptors may be network addresses or other identifiers for devices that may be deployed as tracer devices.

For each device in block 1506, many data points may be collected. In the example of embodiment 1500, these data points may be illustrated as being collected prior to deploying tracer objectives. In many embodiments, some of the various data points may change over time and may be updated periodically. Other data points may be relatively constant and may not be updated as frequently.

A hardware configuration may be determined in block 1508. The hardware configuration may include processing capabilities and capacities, storage capacities, and other hardware parameters.

A network topology may be determined in block 1510. The network topology may include locating the tracing device within a network, which may be used as an input parameter when determining where to deploy a tracer objective.

The software configuration of the tracer device may be determined in block 1512. In some cases, the software configuration may include specific tracing capabilities. Some embodiments may have a non-homogenous group of tracing devices, with some devices having tracing capabilities that other devices may not have. Further, some devices may have certain additional software components or workloads that may interfere, influence, or degrade tracing capabilities in some cases. Such knowledge may be useful in matching specific tracing objectives to devices.

In some embodiments, a performance test may be performed in block 1514. The performance tests may measure certain performance capabilities that may be measured dynamically, as opposed to static analyses such as performed in blocks 1508 through 1512.

The performance tests of block 1514 may measure processor capabilities, storage resources, network bandwidth, and other performance metrics. In some cases, performance tests may be performed while the application under test is executing. The performance tests may identify the resources consumed by the device, which may be used as a factor when computing a resource budget for tracing.

Predefined allocations may be identified in block 1516. The predefined allocations may be any limitation or resource allocation that may take precedence over tracing. For example, a production application may be allocated to execute without any tracing during periods of high workload. Such an allocation may be time based, as resources may be allocated based on a period of time. In another example, a device may have resources allocated to a second application or function that may be unrelated to the application under test and any associated tracing functions.

In some cases, certain devices may have allocated resources that may be dedicated to tracing functions. For example, a device may have a storage system and network interface card that may be allocated to tracing, while another storage mechanism and network interface card may be allocated to the application under test. Such devices may be specially allocated for tracing, while other devices may have limited or no resource availability for tracing.

An initial tracer resource budget may be defined in block 1518. A tracer resource budget may define the resources that may be consumed by a tracer objective for a particular device. In some cases, the tracer resource budget may be set as a percentage of overall capacity. For example, a tracer resource budget may be 5%, 10%, 20%, 25%, 50%, or some other percentage of resources.

In some cases, a tracer resource budget may be a percentage of available resources. For example, the performance tests in block 1514 may determine that an application under test may consume 45% of the processor capacity, meaning that 55% of the processor capacity may be not be utilized and could be available for tracing. In a simplified version of such an example, up to 55% of the processor resource could be allocated for tracing without adversely affecting the application.

After determining the various parameters, the configuration of the device may be stored. Some of the elements in the configuration may be relatively static, such as the hardware configuration and network topology, while other elements such as the available resources may change dramatically over time. Some embodiments may monitor the configuration and update various elements over time.

After characterizing the devices in block 1504, the tracer objectives may be characterized in block 1522. The deploying step of block 1524 may match the tracer objective characteristics with the device characteristics and cause the tracer objectives to be executed. The results may be received and analyzed in block 1526.

Figure 16:
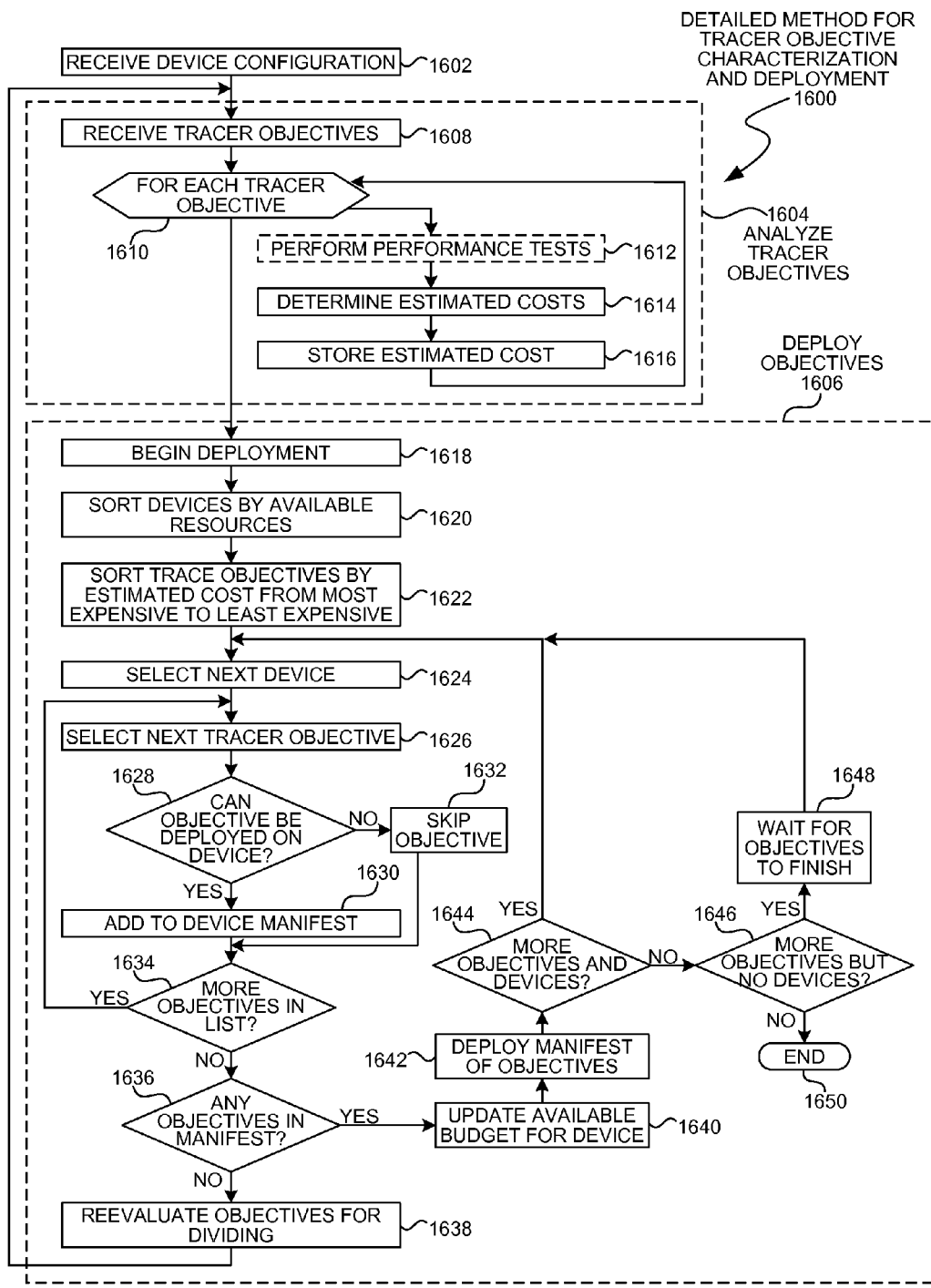
FIG. 16 is a flowchart illustration of an embodiment showing a detailed method for tracer objective characterization and deployment.

FIG. 16 is a flowchart illustration of an embodiment 1600 showing a method for tracer objective characterization and deployment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1600 illustrates a detailed method for characterizing tracer objectives then matching those tracer objectives with available devices. A manifest of tracer objectives may be created for each device, then the manifests may be deployed to the devices for execution.

The method of embodiment 1600 may attempt to place the most costly tracer objectives on the devices with the most available resources. Multiple tracer objectives may be added to a device until all of the allocated tracing resources may be utilized. Embodiment 1600 may attempt to use all of available tracing resources of each device being examined. Such an embodiment may result in some devices being fully loaded while other devices may not have any tracer objectives.

The method of embodiment 1600 illustrates merely one method for matching tracer objectives to devices, and other embodiments may have different ways for distributing tracer objectives. For example, another embodiment may attempt to load all devices equally such that each device may perform at least some tracing.

Device characterizations may be received in block 1602. An example of device characterizations may be found in embodiment 1500.

The tracer objectives may be analyzed in block 1604 and then deployed in block 1606.

The tracer objectives may be received in block 1608. For each tracer objective in block 1610, an initial performance test may be performed in block 1612. The costs associated with executing the tracer objective may be estimated in block 1614 and stored in block 1616.

The costs for executing a tracer objective may be resource costs. In some cases, several independent factors may make up the cost. For example, processors costs, storage costs, and network bandwidth costs may be combined into the overall cost of executing a tracer objective. In embodiments where a dynamic performance test may not be performed in block 1612, the costs may be estimated by static analysis of the tracer objectives. A static analysis may estimate the processor load, storage usage, and network bandwidth usage for a given tracer objective.

The deployment of objectives may begin in block 1618 by sorting the devices by available resources in block 1620. The trace objectives may be sorted by estimated cost from most expensive to least costly in block 1622.

A device may be selected in block 1624 and the next tracer objective may be selected in block 1626. An evaluation may be made in block 1628 to determine whether the objective may be deployed on the device. When the tracer objective can be deployed in block 1628, the tracer objective may be added to the device's manifest in block 1630. When the tracer objective cannot be deployed in block 1628, the objective may be skipped in block 1632.

The evaluation of block 1628 may evaluate the selected tracer objective for execution on the selected device. The evaluation may examine whether or not any specific allocations may exist that may prevent the tracer objective from being executed, as well as comparing the cost of executing the tracer objective with the available resource budget on the device. Some embodiments may perform other tests or evaluations to determine whether or not an objective may be placed on a device.

When more objectives are on the list in block 1634, the process may return to block 1626. The loop back to block 1626 may process each available tracer objective to attempt to use all of the available resources on the selected device.

When all objectives have been processed in block 1634, if no tracer objectives may have been placed in the manifest, the objectives may be evaluated in block 1638 for dividing into smaller tracer objectives. The process may return to block 1608.

The operations of block 1638 may be reached when a device is selected but there are no tracer objectives that may be small enough or consume fewer resources than may be available on the device. In such a situation, the tracer objectives may be divided into two or more tracer objectives and the placement may be retried.

In block 1638, a tracer objective may be evaluated for dividing into two or more tracer objectives. In some cases, a tracer objective may be modified by changing the sampling rate or setting other parameters so that the cost impact may be lessened.

Provided that there are tracing objectives in the manifest in block 1636, the available budget for the device may be updated in block 1640 to reflect that the tracing objectives may be executing. The manifest may be deployed in block 1642 to the selected device.

When more objectives and more devices still remain in block 1644, the process may return to block 1624 to process the next device. When more objectives remain but no more devices in block 1646, the process may wait in block 1648 until some of the tracer objectives to finish processing. At that point, remaining objectives may be allocated and dispatched. When all of the objectives have been allocated, the process may end in block 1650, at which point an analysis operation may be performed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
   receiving an application to instrument;
   analyzing said application to identify a plurality of objects;
   creating a set of trace objectives by creating a trace objective for each of said plurality of objects;
   causing each of said trace objectives to be deployed on an instrumented environment that executes said application, said instrumented environment generating a result set for a trace objective;
   performing a static code analysis of said application to identify a preliminary list of functions;
   performing an initial trace of said application using said preliminary list of function to generate a detailed list of function;
   analyzing said detailed list of functions to determine said plurality of objects; and
   collecting said result set from each of said trace objectives;
   aggregating said result sets to create an aggregated result set.

2. The method of claim 1, said plurality of objects being a subset of all functions in said application.

3. The method of claim 1, said objects comprising portions of executable code within said application.

4. The method of claim 3, said portions of executable code being defined by a function.

5. The method of claim 3, said portions of executable code being defined by a function call and return.

6. The method of claim 3, said portions of executable code being a process spawned by said application.

7. The method of claim 1, said objects comprising memory objects.

8. The method of claim 1, said analyzing said application comprising static code analysis of said application.

9. The method of claim 1, said analyzing said application comprising executing said application in said instrumented execution environment.

10. The method of claim 1, said result set comprising an observed data point.

11. The method of claim 1, for each of said trace objectives, defining a condition for collecting instrumentation data from said application.

12. The method of claim 1, said trace objectives being deployed on a plurality of instrumented environments.

13. A system comprising:
   a processor;
   a trace objective generator operating on said processor, said trace objective generator that:
      receives an application to instrument;
      analyzes said application to identify a plurality of objects;
      creates a set of trace objectives by creating a trace objective for each of said plurality of objects;
   a dispatcher that:
      causes each of said trace objectives to be deployed on an instrumented environment that executes said application, said instrumented environment generating a result set for a trace objective
   performing a static code analysis of said application to identify a preliminary list of functions;
   performing an initial trace of said application using said preliminary list of function to generate a detailed list of function;
   analyzing said detailed list of functions to determine said plurality of objects, each of said trace objectives that further transmits said result set to a data collector.

14. The system of claim 13 further comprising:
   a static code analyzer that:
      performs a static code analysis on said application to identify at least a portion of said plurality of objects.

15. The system of claim 13 further comprising:
   a high level tracer that performs an initial trace on said application to identify at least
   a portion of said plurality of objects.

16. The system of claim 13, said trace objectives comprising a communications configuration that defines communications settings with said data collector.

17. The system of claim 13, said trace objectives comprising descriptors for an input stream, said input stream being captured with said result set.

18. The system of claim 13, said trace objective generator that:
   identifies a first object in said application;
   identifies a second object in said application, said second object having a relationship to said first object; and
   creates a first tracer objective comprising said first object and said second object.

19. The system of claim 18, said relationship being defined during a static code analysis.

* * * * *